United States Patent
Kucharski et al.

(10) Patent No.: US 9,939,794 B2
(45) Date of Patent: Apr. 10, 2018

(54) JOG PUSH BUTTON

(71) Applicant: Rockwell Automation Technologies, Inc., Mayfield Heights, OH (US)

(72) Inventors: Paul G. Kucharski, Mukwonago, WI (US); Joseph P. Izzo, New Berlin, WI (US); Ronald E. Bliss, Twinsburg, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 674 days.

(21) Appl. No.: 14/499,576

(22) Filed: Sep. 29, 2014

(65) Prior Publication Data

US 2015/0018978 A1   Jan. 15, 2015

Related U.S. Application Data

(63) Continuation of application No. 13/113,929, filed on May 23, 2011, now Pat. No. 8,849,427.

(51) Int. Cl.
  *G05B 15/02* (2006.01)
  *G05B 19/045* (2006.01)
  *G05D 3/00* (2006.01)

(52) U.S. Cl.
  CPC .......... *G05B 15/02* (2013.01); *G05B 19/045* (2013.01); *G05D 3/00* (2013.01); *G05B 2219/36153* (2013.01); *G05B 2219/50048* (2013.01)

(58) Field of Classification Search
  CPC .................. G05B 15/02; G05B 19/045; G05B 2219/36153; G05B 2219/50048; G05D 3/00
  See application file for complete search history.

(56) References Cited

U.S. PATENT DOCUMENTS 3,668,653 A   6/1972   Fair et al.
5,455,762 A   10/1995  Braun
(Continued)

FOREIGN PATENT DOCUMENTS

CN   201060406   5/2008
CN   101231511   7/2008
(Continued)

OTHER PUBLICATIONS

Chinese Office Action dated Jan. 20, 2016 for Chinese Patent Application No. 201210163201.4, 7 pages.
(Continued)

*Primary Examiner* — Carlos Ortiz Rodriguez
(74) *Attorney, Agent, or Firm* — Amin, Turocy & Watson, LLP

(57) ABSTRACT

Systems and methods are provided to facilitate correct execution of a machine jog operation where a plurality of interfaces can generate a machine jog command, which is received by an industrial controller. One or more machine jog commands can be received and state data is maintained regarding whether a machine jog command has been received. An OR gate logic operation is performed on the state data to determine whether a machine jog operation has been received from any of the plurality of interfaces, and in the event of receiving a machine jog operation, a control command is generated to effect a machine jog operation. The plurality of interfaces enable interaction with the controller, to facilitate control of a machine from a plurality of locations. The system can be expanded to include further interfaces. Also, information regarding a machine jog command can be published to the plurality of interfaces.

20 Claims, 14 Drawing Sheets

(56) References Cited

U.S. PATENT DOCUMENTS

| | | |
|---|---|---|
| 6,529,785 B1 | 3/2003 | Keeley |
| 2005/0055111 A1 | 3/2005 | Law et al. |
| 2006/0049965 A1 | 3/2006 | Laliberte et al. |
| 2009/0313549 A1 | 12/2009 | Casner et al. |
| 2010/0305758 A1 | 12/2010 | Nish et al. |

FOREIGN PATENT DOCUMENTS

| | | |
|---|---|---|
| EP | 0978771 | 2/2000 |
| JP | 2006094452 | 4/2006 |

OTHER PUBLICATIONS

Chinese Office Action dated Jun. 2, 2015 for Chinese Patent Application No. 201210163201.4, 4 pages.

European Office Action dated May 9, 2014 for European Patent Application No. 12168857.6, 5 pages.

Chinese Office Action dated Dec. 19, 2013 for Chinese Patent Application No. 201210163201.4.

Extended European Search Report dated Aug. 16, 2012 for European Patent Application No. 12168857.6, 8 pages.

Office Action dated Jan. 31, 2014 for U.S. Appl. No. 13/113,929, 1 page.

Office Action dated Jun. 21, 2013 for U.S. Appl. No. 13/113,929, 1 page.

Chinese Office Action dated Nov. 15, 2014 for Chinese Patent Application No. 201210163201.4, 4 pages.

JOG PUSH BUTTON

CROSS REFERENCE TO RELATED APPLICATIONS

This application is a continuation of, and claims the benefit of priority to, U.S. patent application Ser. No. 13/113,929 entitled "Jog Push Button" and filed May 23, 2011. The entirety of the above noted application is herein incorporated by reference.

TECHNICAL FIELD

The subject specification relates generally to control systems employed in an industrial automation environment and in particular to controlling operation of a machine jog procedure(s).

BACKGROUND

Computer systems, as with other operating environments, have found numerous applications in an industrial automation environment and can be found ubiquitously employed throughout, e.g., to control the operation of a device, machine, process, and the like. However, rather than entering commands though a single interface, the size of the operation being controlled may require an operator to be positioned at a plurality of locations (e.g., operator stations) to facilitate full understanding and operation of the machine as the machine runs through its series of operations in accord with the process requirements being conducted therewith.

For example, a cold chamber die casting machine with a locking force rated in the thousands of tons can be of a considerable size requiring an operator to position themselves in a number of locations with respect to the die casting machine during operation, such as at the furnace during loading of liquid metal into the shot sleeve, by an extraction mechanism (e.g., a robot) during removal of a casting, by the spray system during spraying of the die cavity with lubricant, etc. Similar requirements can occur with a large forging press, sheet metal press, and other machines of such scale that an operator cannot effectively review operation of the machine from a singular location. Alternatively, a manufacturing process may comprise of a plurality of machines connected by material handling devices (e.g., conveyors) and a number of operator stations are located throughout the manufacturing process enabling an operator to control the process from a number of vantage points. Further, rather than the operator controlling the machine from a single interface (e.g., a human machine interface (HMI), graphical user interface (GUI), terminal, and the like), a plurality of interfaces may be associated with the machine, e.g., an interface located at each of the operator stations. During operation of a machine, the operator may generate control commands from a first interface and then move on to a second interface and control the machine from there, and subsequently move to a third interface and further control the machine from the third interface.

A variety of control software is available to control machines with some code languages and code types being of open source and others being proprietary to a particular manufacturer (e.g., manufacturer of industrial equipment). Further, there are different ways of controlling a machine based upon capturing and transmitting data, where the data can be forwarded from an interface to a controller, or a controller can request data (e.g., by polling or other sequential and non-sequential manners), and the like. However, a situation can arise where control data is received from a plurality of interfaces concurrently or in a sequential manner. For example, machine control may be performed from any of three interfaces associated with a controller, where, for example, the control process is a binary one such as control of a jog operation, with a data value of "0" equating to perform "no jog" operation, and a data value of "1" equating to perform "jog" operation.

A jog process can involve an operator initiating a jog motion to facilitate intermittent motion of a machine component with respect to a work piece, datum, or the like. For example, positioning of a die in a die casting machine, locating a machine head with respect to a work piece, etc. Rather than being a command for continuous movement of a component, e.g., placement of a machine head, a jog command is a command resulting in a predefined amount of displacement (e.g., motion) for each generation of a jog request. For example, pressing of a "move" button can cause a machine head to move continuously in a certain direction while the move button is pressed. However, a "jog" button can be programmed such that only a predefined degree of displacement is effected for a single press of the button and the button has to be "released" (e.g., finger pressure removed from button) before the button can be re-pressed for the next jog request to be effected. For example, a machine can be configured, such that when the operator executes (e.g., presses) the jog button the machine head travels a prescribed distance, e.g., ten thousands of an inch, one millimeter, 10 microns, etc.

However, if signals are being received from a plurality of interfaces a problem can occur where a controller, associated with the plurality of interfaces, is using a single jog status field to determine whether a machine jog is to be performed. For example, in a situation where jog request signals are being generated by any or all of three interfaces coupled to a controller, and the jog request signals each update a single jog status field, then a jog status received from a first interface can be overwritten by a jog status subsequently received from a second interface. In this scenario, a situation can occur where a Jog signal is received from interface #1, but a subsequent no jog signal is received from interface #2. Upon receiving a jog signal from interface #1 a jog status field is set to a value of "1", however, upon receiving the subsequent no jog signal from interface #2, the jog status field is set to a value of "0". Given that the no jog signal received from interface #2 is subsequent to the jog signal received from interface #1, the interface #1 signal is overwritten by the interface #2 signal, and when the jog status field is accessed, a value of "0" is read, and no machine jog is performed, even though the operator had activated a jog from interface #1. Hence, in a situation where a plurality of interfaces are writing data, such as jog data signals, at a rate sufficient to support machine operations, and the last setting of a jog status field is continually read as being set to "0", perform no jog, then no matter what the values were applied to the jog status field between a prior reading of the jog status field and a subsequent reading of the jog status field, a controller considers the value of the jog status field to have continually been set to "0" and no jog is performed even though an operator at interface #3 is pressing the jog button.

For the sake of readability an interface, HMI, GUI, and the like are referred to as a interface, however, it is to be appreciated that the term interface relates to any device, machine, component, software, etc., facilitating communication between an entity controlling an operation and a device, machine, component, software, etc., effecting or performing the operation.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Systems and methods are provided which include generation and capture of one or more jog requests from a plurality of interfaces by a controller. In various, non-limiting embodiments, a jog status component comprises a jog status table comprising a plurality of fields, wherein each field is uniquely assigned to a particular interface. As jog signals are generated and received at the jog status component, a jog status value (for a jog status field) for a particular interface alternates state between "0" which equates to perform no jog operation and "1" which equates to perform jog operation. At any specific moment, when the controller needs to determine whether a jog is to be performed, an OR gate operation is performed on the respective values of the jog status fields. According to a truth table, employed by a jog status determination component, if all of the jog status' for each of the fields comprising the jog request table is "0" then no jog is performed, and no perform jog operation command is generated. However, if one or more of the jog status' is a "1" then a perform jog operation request is determined to have been generated and an according perform jog command is generated.

In another, non-limiting embodiment, if an additional interface is added to the system, an interface determination component can add an additional jog status field to the jog status table for entry of a jog state value(s) for the additional interface. Additionally, in another non-limiting embodiment, if it is determined that an interface is no longer to provide jog requests, the jog status field associated with the particular interface can be removed from the jog status table. In a further non-limiting embodiment, authentication and authorization procedures can be employed to determine whether to add an additional interface to an existing interface-controller system.

In a further, non-limiting embodiment, if it is determined that an interface is not performing as anticipated (e.g., generating erroneous signals or has lost communication with the controller) the respective jog status field can be set to a safety setting, such as perform no jog status.

In another, non-limiting embodiment, information regarding which interface, or plurality of interfaces, is generating the request to perform a jog operation can be presented to any or all of the interfaces. Such a procedure enables an operator of an interface to identify which interface(s) associated with a machine is being employed to initiate a jog function. This allows an operator to determine whether an interface is performing erroneously.

In another, non-limiting embodiment, a position monitoring system is presented which, in conjunction with an alarm component(s) determines whether a jog request is to be serviced or not, and also what associated actions to perform, e.g., generate an alarm, override a jog request, etc.

These, and other embodiments, are described in more detail below.

BRIEF DESCRIPTION OF THE DRAWINGS

Various non-limiting embodiments are further described with reference to the accompanying drawings in which:

FIG. 9, is a block diagram illustrating an exemplary, non-limiting embodiment to facilitate determination of whether a jog request is to be complied with.

FIG. 10 depicts a flow diagram illustrating an exemplary, non-limiting embodiment for determining whether a jog request is to be complied with.

DETAILED DESCRIPTION

Overview of Plural Jog Button Operation

Figure 1:
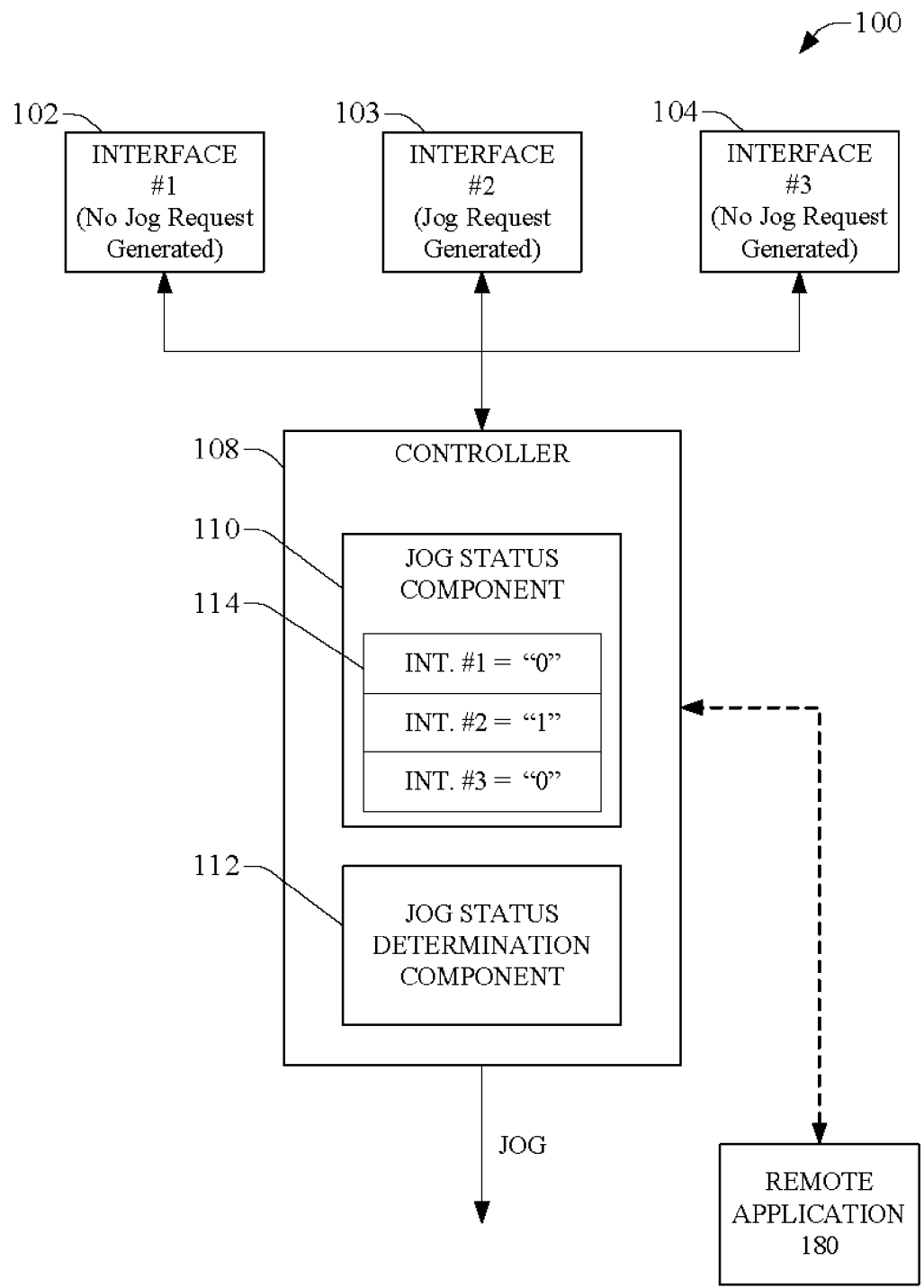
FIG. 1 is a block diagram illustrating an exemplary, non-limiting embodiment for effecting control of a device when a perform jog request is generated from a plurality of interfaces.

As discussed in the background, conflicts can occur when a plurality of interfaces are employed to interact with a controller. For instance, a controller may be being employed to control a single operation on a machine (e.g., a machine jog operation) but a plurality of sources (e.g., interfaces) can equally provide requests to generate the operation, and hence, a first request from one interface can be subsequently overwritten by a second request from a second interface, where the first request and second request are contrary to each other, e.g., a perform an action request is received from the first interface while a do not perform an action request is received from the second interface, wherein the second request overwrites the first request and, as far as the controller is concerned, no request to perform an action has been received from either the first interface or the second interface. In various, non-limiting embodiments, a jog status component is presented which comprises a plurality of fields, wherein each field is uniquely assigned to a particular interface. As signals are generated relating to whether a machine jog is to be performed, and received at the jog status component, a jog status value for a particular interface alternates state between "0" which equates to perform no jog operation and "1" which equates to perform jog operation. At any specific moment, when the controller needs to determine whether a jog is to be performed, a parsing operation can be executed. In a non-limiting, exemplary embodiment, a parsing operation can be an OR gate operation performed on the respective jog status(s). According to a truth table, if all of the jog status' for every one the jog states is "0" then no jog is performed. However, if one or more of the jog status' is a "1" then a perform jog control signal can be generated.

It is to be appreciated that while the various embodiments disclosed herein are described with reference to whether a machine jog operation is to be performed, or not, the various embodiments relate to any application comprising of a plurality of sources generating signals, wherein the signals can lead to a situation of a prior signal being overwritten by a subsequent signal which leads to the request represented in the prior signal being ignored.

It is further to be appreciated that while the concept of a jog operation is applied herein to movement of a machine or component comprising a machine, a jog operation can also be performed on any component, device, system for monitoring a displacement, system for monitoring and/or determining a change in position, and the like. For example, the jog operation can be applied to shifting of a valve to facilitate opening/closure of flow path. In another example, the jog operation can be conducted to facilitate change in a digital counter being recorded on a computer. In effect, a jog operation can be applied to any instance where a change in a dimension is effected, whether the dimension be position (e.g., with regard to a single dimension, two dimensions, or three dimensions, etc.), time, a combination of time and position, mass, and the like.

OR Gate Operation with a Plurality of Terminals

With respect to one or more non-limiting aspects of the jog button operation with a plurality of interfaces as described above, FIG. 1 shows a block diagram illustrating an exemplary, non-limiting embodiment for effecting control of a device when a perform jog request is generated from one or more of a plurality of interfaces. As shown in FIG. 1, a plurality of interfaces 102-104 are communicatively coupled to controller 108, where the controller 108 can be employed to control a process, device, machine, and the like, associated with an interface (e.g., any of interfaces 102-104).

It is to be appreciated that an interface (e.g., any of interfaces 102-104) can comprise of any device, machine, software, etc., suitable to facilitate generation of a jog request. In a non-exhaustive listing, an interface can comprise of a switch which is activated (e.g., a push button is pressed) when a jog is to be performed, an interface can be a touchscreen where a region of the screen is defined to be a jog button and each time the region is touched a jog operation is effected, further, an interface can be a button rendered on a screen and is selected using a mouse cursor, etc.

It is further to be appreciated that controller 108 comprises one or more processors, storage media, and other components/software necessary to facilitate controlling of a device, machine, and the like, associated with the controller 108 and an interface being employed to generate control signals (e.g., machine jog/no jog commands).

Upon generation of the jog request, the jog request signal is forwarded from the interface to the controller 108. As shown in FIG. 1, controller 108 comprises a jog status component 110 and a jog status determination component 112. Jog status component 110 further comprises a means for storing jog status', where such means can be a table, list, database, data store, and the like, wherein each of the jog status fields comprising jog status component 110 are each uniquely assigned to an individual interface. As shown in the illustrated example of FIG. 1, a table 114 comprises three jog status fields, each field being associated with a particular interface 102-104, e.g., interface #1, interface #2, and interface #3. As described, when a jog request is generated at an interface (e.g., any of interfaces 102-104) a signal is generated at the interface and, upon receipt at the controller, causes a jog status value to be set to "1". Further, interfaces 102 and 104 can also generate a no jog signal, e.g., "0", at predefined moment(s) indicating that no machine jog request has been executed at that moment, and the no jog signal "0" is forwarded from each respective interface 102-104, to controller 108. In the example illustrated in FIG. 1, INT. #2 field of table 114 (associated with Interface #2 (103)) has a jog status of "1" indicating that a jog operation was requested at interface #2 (103), while INT. #1 (associated with Interface #1 (102)) and INT. #3 (associated with Interface #3 (104)) have, respectively, a jog status of "0" indicating that no jog operation was requested (or received) from interface #1 (102) or interface #3 (104).

A jog status determination component 112 is employed to facilitate determination of whether a jog operation is to be performed. The jog status determination component 112 performs an OR gate logic operation on the jog status fields comprising table 114. Table 1, below, presents a truth table with the various jog status' for interfaces #1, #2 and #3 (e.g., interfaces 102-104) and the corresponding output. It is to be appreciated that Table 1 comprises the necessary truth table matrix sized based upon the number of interfaces for which generation of a jog status request is being monitored, e.g., in the exemplary illustration three interfaces (102-104) are being monitored and Table 1 comprises a truth matrix for three jog status values. If only two interfaces were being monitored, a truth table matrix for two interfaces (A and B) and four jog status' 0 0, 0 1, 1 0, and 1 1, would be employed.

TABLE 1

Truth Table for OR Gate Logic

| JOG STATUS | | | JOG STATUS OUTPUT |
| --- | --- | --- | --- |
| #1 | #2 | #3 | #1 + #2 + #3 |
| 0 | 0 | 0 | 0 |
| 1 | 0 | 0 | 1 |
| 0 | 1 | 0 | 1 |
| 0 | 0 | 1 | 1 |
| 1 | 1 | 0 | 1 |
| 0 | 1 | 1 | 1 |
| 1 | 0 | 1 | 1 |
| 1 | 1 | 1 | 1 |

Table 1, presents in tabulated form the result of executing an OR gate logic of:

(jog status INT #1) OR (jog status INT #2) OR (jog status INT #3)=JOG STATUS OUTPUT     (eqn. 1)

As shown by Table 1 above, in conjunction with table 114, upon executing the OR gate logic equation 1, if one or more of the jog status' fields comprising table 114 has a value of "1" the jog status determination component 112 identifies that one or more of the interfaces (102-104) have generated a jog request and, based thereon, controller 108 generates a perform jog command which can be further processed, e.g., transmitted, as required.

In accordance with the exemplary settings shown in table 114, interface #2 has generated a perform jog request, while interfaces #1 and #3 have not generated a perform jog request, or have generated a perform no jog request. Controller 108 generates a jog command based upon the determination, by jog status determination component 112, that interface #2 has generated a jog request.

Upon generating the jog command at the controller 108 (and further processing the command, e.g., outputting the jog command) the jog status fields comprising table 114 can be reset to "0" and another computation cycle is performed. During execution of the next computation cycle if a jog request is not executed at any of the interfaces 102-104 then, during the next execution of the OR gate logic, the values for the jog status values are all determined by the jog status determination component 112 to be "0" and no jog command is generated by controller 108. Alternatively, during execution of the next computation cycle if a jog request is executed at any of the interfaces 102-104 then, during the next execution of the OR gate logic, at least one of the values for the jog status fields is determined by the jog status determination component 112 to be "1" and a jog command is generated by controller 108. The computation cycle and determination of whether to perform, or not, a machine jog, are performed as necessary (e.g., ad infinitum) during operation of the machine, device, etc., to facilitate determination of whether a machine jog has been requested and is to be performed.

In a further exemplary, non-limiting embodiment, if it is determined that communication(s) between an interface, e.g., interface 103, and controller 108, have been lost or are susceptible to interference or other effects resulting in degraded quality of communications, and ultimately, a degree of uncertainty regarding whether correct jog request signals are being received from interface 103, the value of the jog status field, e.g., INT. #2, can be forced to a safe value. Hence, in the exemplary operation with a perform no jog operation having a jog status value of "0", the value entered in INT. #2 can be forced to "0", where perform no jog operation is considered to be a safe machine operating state, e.g., the interface is placed in an "inactive" state. In an exemplary, non-limiting embodiment, such a procedure can be performed when it is known that a particular interface, e.g., any of interfaces 102-104, is going to be taken "off-line", e.g., for maintenance, the associated jog status value can be forced to a value of "0" until the interface is back "on-line" and the force process can be terminated with subsequent normal operation of determining and setting the jog status value being re-established.

In a further exemplary, non-limiting embodiment, options can be provided regarding how controller 108 is to react when communication(s) between controller 108 and any of interfaces 102-104 fail. In a non-exhaustive listing, available options can include "Set", "Reset", and "Hold Last State". Employing the "Set" option enables a jog status value of either "1" or "0" to be entered at the controller 108 by an operator. A "Reset" option can be employed to force the jog status value to either a value of "1" or "0" at the controller 108. A "Hold Last State" option results in the jog status value being maintained at the value received prior to the communication(s) failure.

In another example, system 100 can be configured such that jog/no jog signals are generated from interfaces 102-104 at a predefined time, e.g., every 50 milliseconds. Even though, for example, interface 104 may not be generating a jog request (e.g., a jog request was not executed at interface 104), at each predefined time (e.g., 50 milliseconds) interface 104 generates, and forwards to controller 108, a perform no jog signal, e.g., "0". By generating a perform no jog signal at a predefined moment, if a perform no jog signal is being received at controller 108 from the interface, (e.g., interface 104) with the required frequency, e.g., every 50 milliseconds, then a determination can be made by jog status determination component 112 that there may be a possible problem with communications between interface 104 and controller 108 and the corresponding field in table 114, e.g., INT. #3, can be forced to a safe value of "0", perform no jog operation.

Regarding execution of the OR gate logic process, and timing thereof, execution can be performed at any time. Given that an operator may activate the jog request operation a number of times, e.g., operator presses a jog button a number of times in rapid succession, the execution of the OR gate logic process should be with a frequency to ensure that the jog button event(s) and subsequent jog request generation(s) is captured. For example, communication speeds between an interface and a controller may be about 25 milliseconds, while an operator may press the jog button with a frequency in the order of about 100-200 milliseconds. Hence, based on the foregoing, execution of the OR gate logic process is performed at about every 25 milliseconds whereby the execution of the OR gate logic process has a frequency of execution greater than that with which an operator can press a jog button, and the jog requests are easily captured. It is envisaged, that if an operator presses the jog button every 100 milliseconds, and the OR gate logic process executes every 25 milliseconds, approximately every one in four executions of the OR gate logic process will coincide with a jog request. For the remaining three executions all jog status values will remain at "0". It is to be appreciated that while figures of 100 milliseconds and 25 milliseconds are presented herein, the OR gate logic operation is not limited to such timings. The OR logic gate operation can be applied to any jog operation being performed by an external device (e.g., any of interfaces 102-104) and a controller (e.g., controller 108) and the timing(s) of the jog request operation and execution of the OR gate logic operation can be configured to comply with any operation timings, e.g., 2 to 5 second response timing associated with an interface (e.g., a timing comparable with an I/O module) and timings associated with a physical push button.

It is to be further appreciated that, between given executions of the OR gate logic process, the execution timing of the OR gate logic process may be such that two or more perform jog request(s), and perform no jog request(s), can be generated and received for a given monitoring period, e.g., between a first execution of an OR gate logic process and a second execution of the OR gate logic process. In an exemplary, non-limiting embodiment during a given monitoring period it is not allowable for a perform jog request value in table 114 to be overwritten by a perform no jog request value subsequently received in the same monitoring period.

In a further, exemplary, non-limiting embodiment controller 108, rather than being controlled solely by interfaces 102-104, a remote application 180 can be employed to implement the jog/no jog request operation. Remote application 180 can be any suitable application or device capable of interacting with controller 108 and generate at least one of a perform no jog request or a perform jog request, thereby allowing operation of controller 108, jog status component 110, jog status determination component 112, and any other components comprising controller 108 to be remotely controlled. Such remote application 180 can be a design software for controlling one or more devices (e.g., controller 108) comprising an industrial automation environment, wherein, in an exemplary, non-limiting application, remote application 180 can be employed to generate perform jog or perform no jog requests facilitating control of the operation of controller 108 along with over-riding any perform jog or perform no jog requests generated by any of interfaces 102-104. Hence, by employing remote application 180, testing of the operation of controller 108, jog status component 110, jog status determination component 112, and any other components comprising controller 108 can be remotely performed.

In a further, non-limiting embodiment, any of interfaces 102-104 can be selected to be in singular control of the jog request operation. For example, rather than an operator being able to employ any of interfaces 1-20-104 to effect a jog request, a situation may arise where the operator knows that they will be working from a particular interface for the foreseeable future, e.g., will be working for the remainder of the day from interface 103. An override of the OR gate logic process can be implemented whereby the operator identifies that interface 103 is the only interface from which jog requests are to be complied with. Via interface 103, any of interfaces 102-104, at the controller 108, or via remote application 180, the operator can enter a setting, e.g., a flag, indicating that the only values to be used for determining whether a jog request is to be performed are to be read from the field in table 114 pertaining to interface 103, e.g., field INT #2. At a subsequent period, when the operator is not exclusively employing a singular interface (e.g., interface 103) the operator can override the flag setting by entering a setting identifying a different interface, e.g., either interface 102 or interface 104, will now be providing the jog requests and the value settings in table 114 pertaining to the new controlling interface are to be complied with, or a setting can be entered, e.g., no flag settings, whereby the OR gate logic process is to be employed across all of the interfaces (e.g., interfaces 102-104) able to provide jog request signals. It is to be appreciated that the flag operation described can be employed to select a subset of interfaces for controlling the jog request operation from a plurality of interfaces available. For example, in a system involving four interfaces, the flag operation can be employed to select on values from interfaces 1 and 3 are to be complied with, while interfaces 2 and 4 are effectively, as far as the OR gate logic process is concerned, taken offline.

A situation can occur where a particular interface that an operator is employing to generate jog request(s) has one or more applications operating thereon which is/are placing a burden on processor resources at the interface. Such burdens, for example, can include a plurality of asynchronous tasks being performed on a terminal owing to a plurality of activities associated with a complex display of data and available operations on an interface display. The burden can result in processing operations running slower than normal or optimum. For example, the slower processing results in a jog request being generated at 200 msec, rather than the expected 100 msec. Similar to that previously described, an operator can override an OR gate logic operation so that only signals generated from the particular interface are complied with, thereby addressing the effects of processing at the interface being less than optimal.

It is to be appreciated that while FIG. 1 illustrates controller 108 and interfaces 102-104 to be distinct devices any interface and controller can be associated in the same unit, e.g., NEMA enclosure. Also, any of the interface(s) or controller can be a portable device, a fixed device, etc. Further, any suitable means for communication between the interface(s) and the controller can be employed and, in a non-exhaustive listing, can comprise of communications over a hard-wired network, wireless-network, combination thereof, and any other suitable communication infrastructure to facilitate transport of signals, data, commands, and the like, between the interface(s) and the controller.

Figure 2:
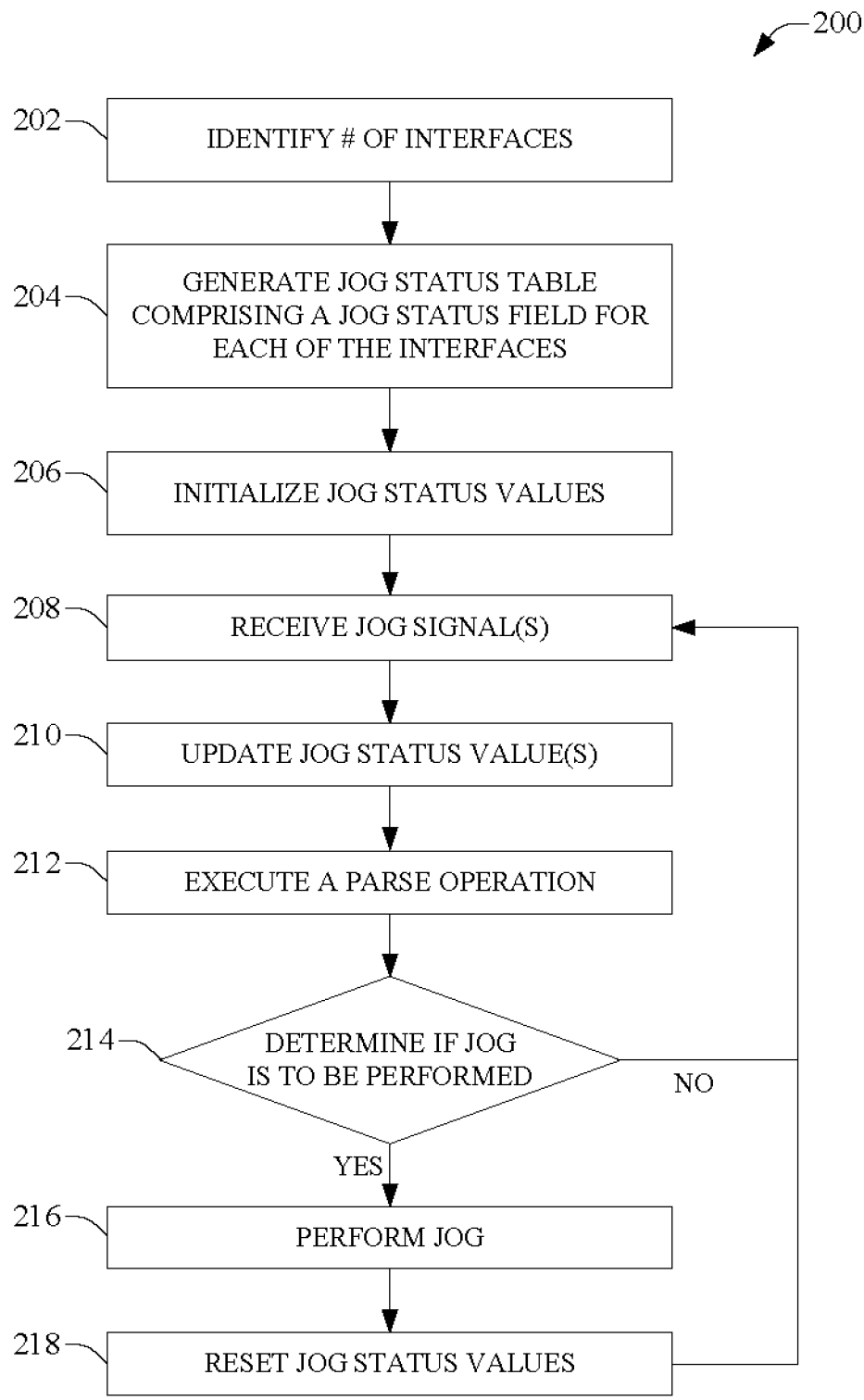
FIG. 2 is a flow diagram illustrating an exemplary, non-limiting embodiment for correctly acting upon jog requests generated by a plurality of interfaces.

FIG. 2 depicts a flow diagram illustrating an exemplary, non-limiting embodiment for correctly acting upon jog requests generated by a plurality of interfaces. The embodiment of FIG. 2 can be utilized by the controller/interface system 100 of FIG. 1 to ensure that one or more jog requests received from interfaces 102-104 are complied with. At 200, the number of interfaces communicatively coupled to a controller is determined, and from which, a jog request can be generated for forwarding to the controller. For example, the number of interfaces in communication with a controller of a diecasting machine is determined, wherein a total of three interfaces are located on, or in the vicinity of, the diecasting machine, e.g., a first interface located by the furnace, a second located at the dies and a third located by an casting extraction robot.

At 204, in accord with the number of interfaces identified to be in communication with the controller, a jog status table is generated. The jog status table comprises a plurality of jog status fields, where each jog status field is uniquely associated with a particular interface. For example, in the event of three interfaces being identified, the jog status table is created with three jog status fields. It is to be appreciated that while the concept of generating a table comprising the necessary number of jog status fields is presented as a non-limiting exemplary embodiment, any suitable means for storing jog status fields can be employed. For example, a table having a predefined number of jog status fields can be created, wherein the predefined number of jog status fields exceeds the number of interfaces in communication with the controller, and each interface is associated with a jog status field, e.g., the predefined table comprises 20 jog status fields, where the first three jog status fields are uniquely associated with each of the three interfaces connected to a controller, and the remaining jog status fields are available to be associated with interfaces subsequently attached to the controller.

At 206, the jog status field values are initialized. In the non-limiting exemplary embodiments presented herein, a jog status field has a value of "0" where a perform no jog request has been generated, received and/or determined, and has a value of "1" where a perform jog request has been generated, received, and/or determined (In an alternative embodiment, a jog status field can have a value of "1" where a perform no jog request has been generated and received or determined, and have a value of "0" where a jog request has been generated and received or determined.) Any suitable means for facilitating the determination that a jog request has been generated, and is to be acted upon, is considered within the bounds of the scope of this disclosure. During the initialization of the jog status fields, the setting for each of the jog status fields is set to a value indicating that a jog request has not been generated. In the non-limiting exemplary embodiments disclosed herein, a perform no jog being generated equates to a jog status field value of "0", hence, during initialization of the jog status all of the fields are set to "0".

At 208, for a given monitoring period (e.g., a monitoring period of 100 milliseconds) one or more signals indicating that a jog request has been generated by one or more interfaces is/are received at the controller from the interfaces. It is to be appreciated that during the same period (e.g., same monitoring period of 100 milliseconds), one or more signals indicating that no jog request has been generated by one or more interfaces is/are generated at the interface(s) where no jog request has been initiated, and the no jog request signals are also forwarded to the controller.

At 210, upon receiving a jog request, the value of the jog status field associated with the interface which generated the jog request is updated with a value of "1", indicating a jog request was received for that interface. Further, upon receiving a no jog request, if the jog status field has not been updated with a value of "1" the jog status field retains a value of "0", a perform no jog status as initially set. Hence, if a jog request is generated for an interface at the beginning (e.g., first 25 milliseconds) of a monitoring period (e.g., 100 milliseconds), but a no jog request is subsequently generated (e.g., in the remaining 75 milliseconds) for the interface during the same monitoring period (e.g., 100 milliseconds) the subsequently received no jog request is unable to cause a jog status field value to change from a "1" to a "0" for that given monitoring period.

At 212, at a particular time, e.g., execution of a computation cycle defined for the controller, a parsing operation is performed on the jog status table, and based thereon a determination is made regarding whether a jog operation is to be performed. In an embodiment, the parsing operation can be an OR gate logic process (e.g., equation 1) which is applied to the jog status table, and respective values of the jog status fields comprising the table identified.

At 214, based upon an outcome of the parsing operation of 212, e.g., the OR gate logic process, a determination is made regarding whether a jog operation is to be performed. As shown in Table 1, if none of the jog status fields contains a value indicating that a jog request was received from any of the interfaces in communication with the controller, e.g., all jog status fields have a value of "0" then an OR gate logic determination can be made that a jog request was not received from any of the interfaces associated with the controller, e.g., only signals indicating perform no jog were received from the interfaces. With the determination that no jog is to be performed the method flow returns to act 208, wherein the interfaces are once more monitored for the next monitoring cycle (e.g., next computation cycle of the controller) to determine whether a jog request is generated during the next monitoring period.

At 214, as shown in Table 1, if any of the jog status fields are set to a value indicating that a jog request was received from any of the interfaces connected to the controller, the OR gate logic determination identifies the received jog request and, accordingly, a perform jog instruction is generated by the controller. At 216, with reference to FIG. 1, for the exemplary monitoring period depicted, interface #2 (103) has generated a jog request and the jog status field for interface #2 (INT. #2) has a value of "1", and accordingly, a perform jog instruction is generated by the controller.

At 218, upon generation of the perform jog instruction, the values for the jog status fields in the jog status table are reset to an initial, perform no jog status, which in accord with the exemplary non-limiting embodiment presented herein, the jog status field have a setting of "0" applied. The method flow then returns to act 208 wherein the interfaces are once more monitored for the next monitoring cycle (e.g., computation cycle of the controller) to determine whether a jog request is generated during the next monitoring period.

Figure 3:
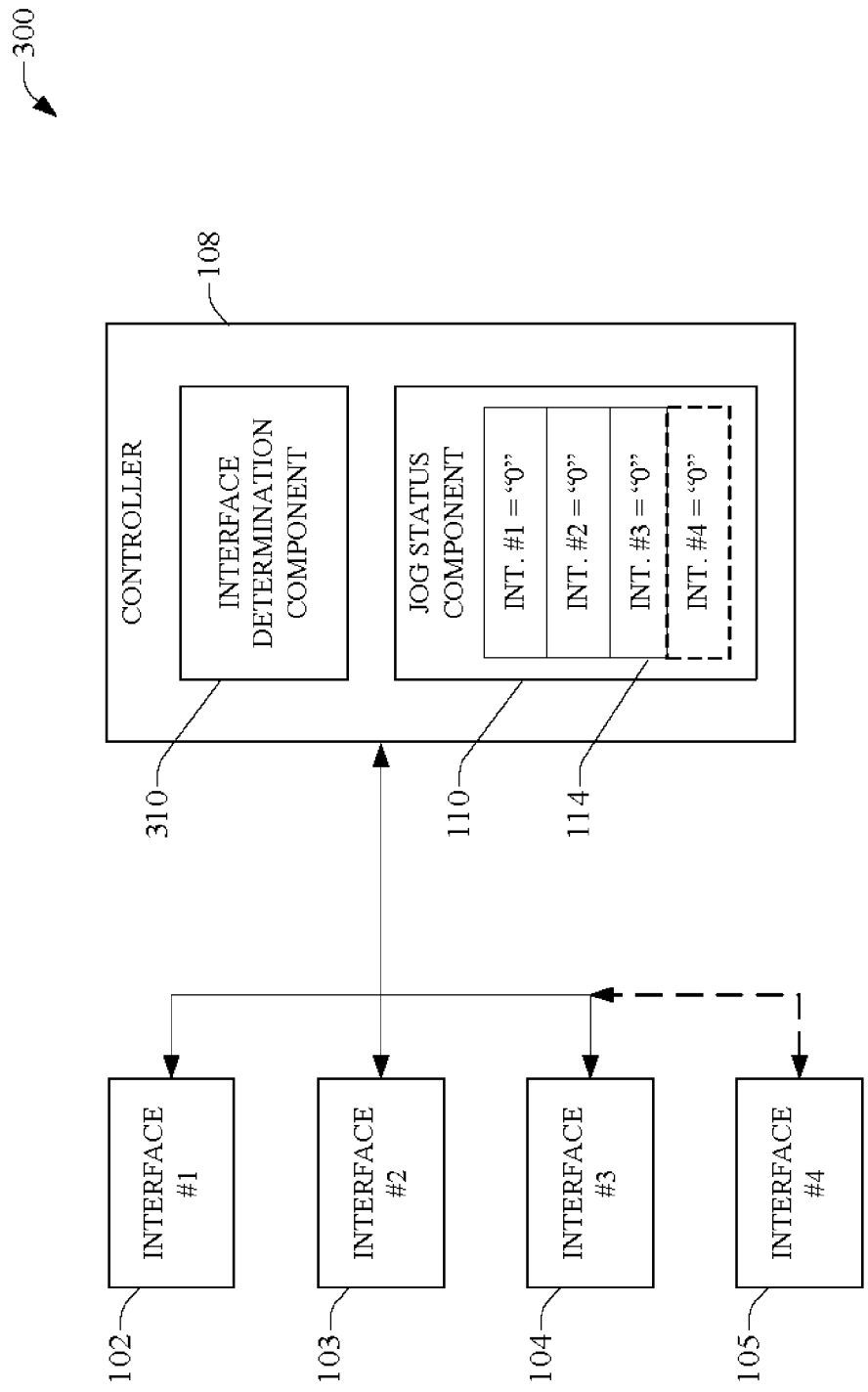
FIG. 3 is a block diagram illustrating an exemplary, non-limiting embodiment to facilitate addition of an interface to the jog control system.

Turning to FIG. 3, is a block diagram illustrating an exemplary, non-limiting embodiment to facilitate addition of an interface to the jog control system. An interface/controller system initially comprises three interfaces (interfaces #1-#3) 102-104 in communication with controller 108, as depicted by the unbroken lines of communication between the interfaces 102-104 and the controller 108. Accordingly, the jog status table 114 is initially generated to comprise of three fields, a first field (INT. #1) uniquely associated with interface #1 (102), a second field (INT. #2) uniquely associated with interface #2 (103), and a third field (INT. #3) uniquely associated with interface #3 (104).

At a subsequent period of time a fourth interface, interface #4 (105), is to be added to the interface/controller system, as depicted by the broken line of communication between interface 105 and the controller 108. For example, a machine was originally located within a factory having limited floor space and there is only room for a single interface to be located at the machine. However, the machine is later moved to a location having a greater amount of available floor space and an additional interface(s) can be coupled to the machine enabling an operator to control the machine from two or more different locations, e.g., operator stations.

To facilitate incorporation of another interface (e.g., interface #4 (105)) into the existing interface/controller system (e.g., as illustrated in FIG. 1), controller 108 comprises an interface determination component 310. The interface determination component 310 monitors resources (not shown) employed by the controller 108 to communicate with interfaces in communication therewith. Any suitable means for identifying the addition of an interface can be employed. One suitable means may include monitoring an MAC ID address table to determine what interfaces (e.g., interfaces #1-#4) are communicating with a controller (e.g., controller 108). Other suitable means may include monitoring a communications network, and devices associated therewith, to detect access requests generated by an interface requiring communication with the controller.

Upon determining that another interface (e.g., interface #4) is to be in communication with controller 108 and provide jog requests therebetween, the interface determination component 310 informs the jog status component 110 of the additionally connected interface (e.g., interface #4). The jog status component 110 generates a new field in the jog status table 114 and uniquely associates the new field (e.g., INT. #4) with interface #4 (105). Accordingly, jog status table 114 is expanded from a table comprising an initial three fields, INT. #1-#3, to a table comprising four fields, INT. #1-#4, as depicted with the broken line. Hence, the jog status table 114 has been sufficiently expanded to facilitate monitoring jog signals from interface #4 (105) in conjunction with jog signals from interfaces #1-#3 (102-104). By employing a jog status table comprising four jog status fields, system 300 functions in a manner described with regard to FIGS. 1 and 2, but with a four variable truth table version of Table 1.

In an exemplary, non-limiting embodiment, when a request for incorporation is received at a controller from an interface, the request can be analyzed to determine whether the interface is suitable for incorporation into the existing system, e.g., the requesting interface operates with the necessary machine logic, coding, etc., to facilitate correct generation of a jog request. Interface determination component 310 can perform, or request the performing by an associated device (not shown), analysis of the request for incorporation, and any associated information, to facilitate the determination of whether an interface is to be incorporated into the existing controller-interface system. With such an approach, during a handshake operation performed as part of the incorporation process, for example, the interface determination component 310 can request the interface provide information identifying whether it can, and/or, should, be incorporated into an existing system. It is to be appreciated that any suitable means of authenticating and authorizing an interface can be employed. For example, a system of license key(s) can be utilized. If an interface does not provide the necessary license key, the request for incorporation can be denied. Such an approach for authentication and authorization can be employed to ensure that an interface (or other device masquerading as an interface) being employed for malicious intent is denied access, hence, only trusted interfaces and other trusted devices are allowed to be incorporated into an existing system.

It is further to be appreciated that the interface determination component 310 can be employed to reduce the number of jog status fields comprising jog status table 114. For example, an interface is to no longer be employed to generate machine jog requests to the controller and the jog status field associated with the interface can be removed from jog status table 114.

Further, for the purposes of illustration and understanding, table 114 of FIG. 3, depicts all four fields INT #1-#4 comprising a value of "0". This is an anticipated initial setting for when a new interface (e.g., interface 105) is added. Also, the four fields for INT #1-#4 each comprising a value of "0" is the value settings for a situation where a table is initialized (e.g., reset) to an initial safe condition of perform no jog for each of the jog status fields, as well as the value settings which would be encountered at a time when no jog request(s) has been generated by any of the interfaces during a given monitoring period.

Figure 4:
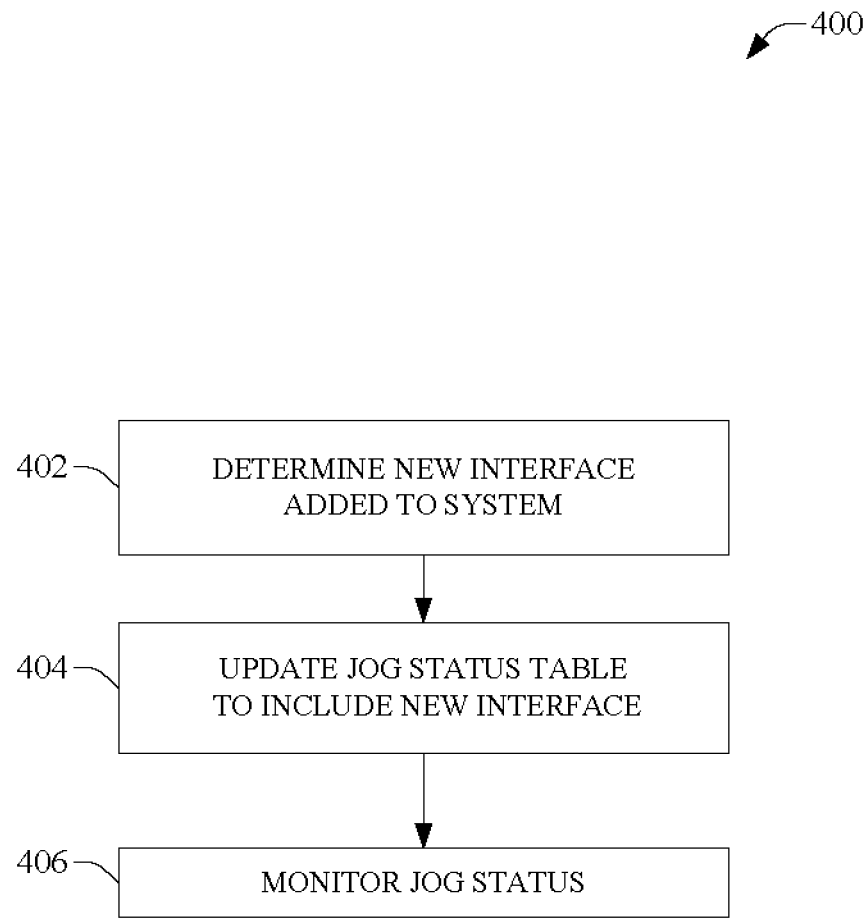
FIG. 4 is a flow diagram illustrating an exemplary, non-limiting embodiment for adding an interface to an existing controller/interface system.

FIG. 4 depicts a flow diagram illustrating an exemplary, non-limiting embodiment for adding an interface to an existing controller/interface system (e.g., system 100 of FIG. 1) facilitating compliance with jog request(s) received from the additional interface in conjunction with signals being generated by the interfaces comprising the existing controller/interface system. The embodiment of FIG. 4 can be utilized by the controller/interface system 300 of FIG. 3 to ensure that one or more jog requests received from interfaces 102-105 are complied with. At 402, means for communicating between an interface and a controller are monitored to determine whether an interface is to be added to an existing system. For example, communication data generated between an interface and a controller can be monitored to determine whether an interface is requiring to be communicatively coupled with the controller, e.g., an interface is requesting communication with the controller to facilitate generation of jog request(s) by the interface to enable jog control of a machine associated with the interface and the controller. In another example, a MAC ID address table can be monitored to determine whether a new interface has been added to the address table, whereupon the new interface is to be employed to generate machine jog requests. Any suitable means for determining a requirement for an interface to be in communication with a controller can be effected.

At 404, upon determining that an interface is to be added to the existing interface/controller a jog status table comprising a plurality of fields for storing a jog status associated with each interface is updated. In an exemplary, non-limiting embodiment, the table is updated, e.g., expanded, to include another jog status field facilitating storing any jog/no jog requests generated by the newly integrated interface.

At 406, with the jog status field for the newly integrated interface incorporated into the jog status table, the newly integrated interface (and the pre-existing interfaces) is monitored to determine whether any jog requests are generated, and if so, are acted upon in a manner as described herein.

It is to be appreciated that while the prior discussion describes an interface being added to an existing system of interfaces communicatively coupled with a controller, the above approach can be applied in the initial creation of a controller/interface system. For example, as a first interface, second interface, and/or subsequent interface, is to be communicatively coupled with the controller, the presence of the interface can be determined and the necessary jog status fields in table 114 (see FIGS. 1 and 3) can be generated to enable a controller/interface system to be built up from a controller with a single interface, to one with a second interface added, etc.

Figure 5:
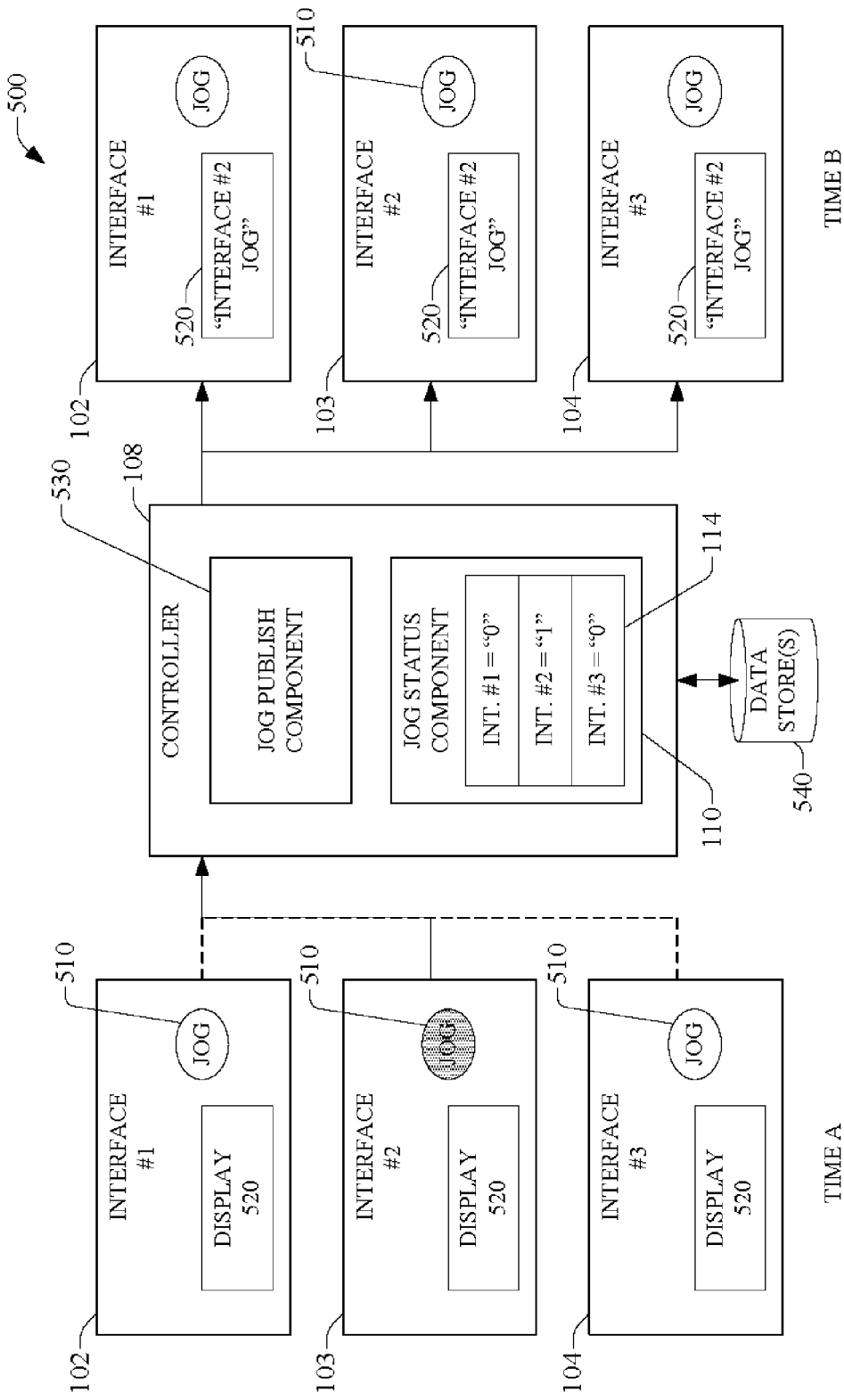
FIG. 5 is a block diagram illustrating an exemplary, non-limiting embodiment to facilitate notification of which interface is generating a jog request.

Turning to FIG. 5, is a block diagram illustrating an exemplary, non-limiting embodiment to facilitate notification of which interface is generating a jog request. To facilitate understanding of the concepts presented herein, FIG. 5 comprises of a common grouping of interfaces 102-104 but at two moments in time, a first moment, Time A, and a second moment, Time B, wherein the interface groupings have been illustrated to depict updating of displayed information based upon monitored activities performed on one or more on interfaces 102-104.

On the left hand side of FIG. 5, are illustrated interfaces #1-#3, 102-104, where the interfaces comprise means to effect a jog request. Each of the interfaces 102-104 comprise a jog button 510 and a display means 520. The jog button 510, as described earlier, facilitates an operator to generate a jog request for a machine being controlled by controller 108. For example, an operator can press the jog button 510 as required to facilitate movement of a workpiece with respect to a tool, opening/closing of dies for casting operation, forging operation, pressing operation, and the like, and any other operation requiring a jog motion. Also, as previously described, jog button 510 can be any device suitable to facilitate an operator initiating a jog request for motion of an associated device, and the controller 108 responding to the jog request. In a non-exhaustive list a jog button 510 can comprise any of: a physical switch which is pressure activated (e.g., being pressed), a defined portion of a touchscreen display, which when touched a signal is generated indicating a jog operation is to be performed, can be displayed on a GUI and is selected by clicking on with a mouse-activated cursor, and the like.

Display 520 enables information concerning which interface(s), any of 102-104, are generating a jog request. For example, display 520 can display information facilitating identification of the interface, any of interfaces 102-104, from which a jog request was generated, where such identification information may comprise a number or similar identification means associated with the interface generating the request. Other information to be displayed can include time of jog request, distance moved in response to one or more jog requests generated by one or more of the interfaces 102-104, and the like. It is to be appreciated that information pertaining to more than one interface can be displayed concurrently, as a function of the displaying means 520. For example, information pertaining to interface 102 and interface 104 can be displayed concurrently.

Display 520 can comprise of any suitable means for presenting the information associated with a jog request. For example, display 520 can be a simple light emitting diode (LED) display that indicates the number of the interface from which the jog request was generated, through to a complex display (e.g., CRT, LED, LCD, monitor screen, touch screen, and the like) which can be employed to provide a plurality of information, and the like.

As illustrated in FIG. 5, interfaces #1-#3 are communicatively coupled with controller 108, as depicted by the broken and unbroken lines of communication. Further, as illustrated in FIG. 5, at Time A, the jog button 510 of interface #2, 103, has been pressed as indicated by the jog button 510 being grayed out. Hence, at Time A, an operator is generating a jog request from interface #2, whereupon the jog request is being forwarded to controller 108, as indicated by the unbroken line of communication. At Time A, only no jog requests have been generated by interfaces 102 and 104, as indicated by the broken lines of communication.

Upon receipt of the jog request, the jog status component 110 updates the jog status value for INT. #2 field from a "0" to a "1", as discussed herein. Along with generating a jog command (see FIG. 1), controller 108, in conjunction with the interface(s), can also provide information regarding the jog request(s). Controller 108 comprises a jog publish component 530 which can generate and publish information pertaining to the jog request. Jog publish component 530 can review information regarding the jog request and forward the information for display on respective displays 520 associated with each interface 102-104. As illustrated in FIG. 5, the jog publish component 530 has determined, in conjunction with the jog status information presented in jog status table 114, that a jog request has been generated and received from interface #2. Accordingly, information indicating that the jog request was generated and received from interface #2 is forwarded, at Time B, to each of the interfaces 102-104, whereupon, the information "Interface #2 Jog" is displayed on the display device 520 of each respective interface 102-104.

FIG. 5, further illustrates at Time B, the jog button 510 associated with interface #2, 103, being reset, e.g., the jog button 510 is no longer grayed out, indicating that the jog button is no longer activated. Between Time B, and a subsequent time, Time C (not shown), in accordance with the controller 108, and monitoring interfaces 102-104, to detect whether a jog request has been initiated, the jog publish component 530 establishes (as described above) whether a jog request has been generated and, if so, publishes information pertaining to the jog request to interfaces 102-104.

An exemplary, non-limiting application of the system and operation as described with regard to FIG. 5 is to assist an operator in determining whether an interface is erroneously generating one or more jog requests. For example, a region of a touchscreen demarked as a jog button to facilitate input of jog requests is being erroneously activated by a foreign body being located on the jog button. Hence, an operator sees a jog operation being performed by the machine but has not instigated a jog request on any of the interfaces available to effect the jog request. By reviewing, at Time B, the information displayed on any of the displays 520 the operator is able to readily discern which on the interfaces 102-104 is effecting the jog request and can address any problem determined based thereon, e.g., remove foreign object from the offending interface.

In a further, non-limiting embodiment, means can be provided at the interface generating the potentially erroneous jog request signal, e.g., because of a foreign object activating the touchscreen, button, and the like, a prompt can be provided requesting the operator confirm whether the jog request signal is to be complied with. For example, on an interface, upon generation of a jog request, e.g., activation of a jog request button, prior to the jog request signal being transmitted from the interface (e.g., interface 104) to the controller (e.g., controller 108), a prompt "Submit Jog Request, Y/N" can be displayed on the interface 104 (e.g., on display 520) whereupon the operator selects "Y" for the jog request to be complied with, or "N" if the jog request is not to be complied with, e.g., the jog request was generated by a foreign object activating the jog request. In a further, exemplary non-limiting embodiment once the operator authorizes the jog request by selecting "Y", the jog operation would be enabled such that the button could be activated multiple times at the interface. And further, the authorization can be disabled if another operation is activated from the interface or, in another example, after expiration of a period of time where no activity has occurred at or via the interface, e.g., the operator has not generated any jog requests for a particular period of time. It is to be appreciated that the time period utilized to determine whether operations from an interface are to be disabled, e.g., after expiration of the time duration, the time period can be entered at controller 108, or via any of interfaces 102-104, e.g., via interactive display device 520.

It is to be appreciated that while FIG. 5 depicts information relating to a jog request being forwarded for display on a display device 520, for the purposes of archiving, operation analysis, etc., the information can be forwarded to a data store(s) 540. The data store(s) 540 acts a repository for the information thereby facilitating subsequent analysis of information relating to any one or more jog requests performed on system 500. For example, when reviewing process information regarding to a machining operation it may be possible to analyze the jog request information to assist in generating improved automation of the machining operation, e.g., if it is determined that an operator is continually having to perform a jog request to adjust a tool position prior to initiation of a cutting operation, positioning commands in the automated machine control data can be reviewed to better position the tool, or workpiece, and thereby reduce the number of instances the operator has to perform the jog request.

Figure 6:
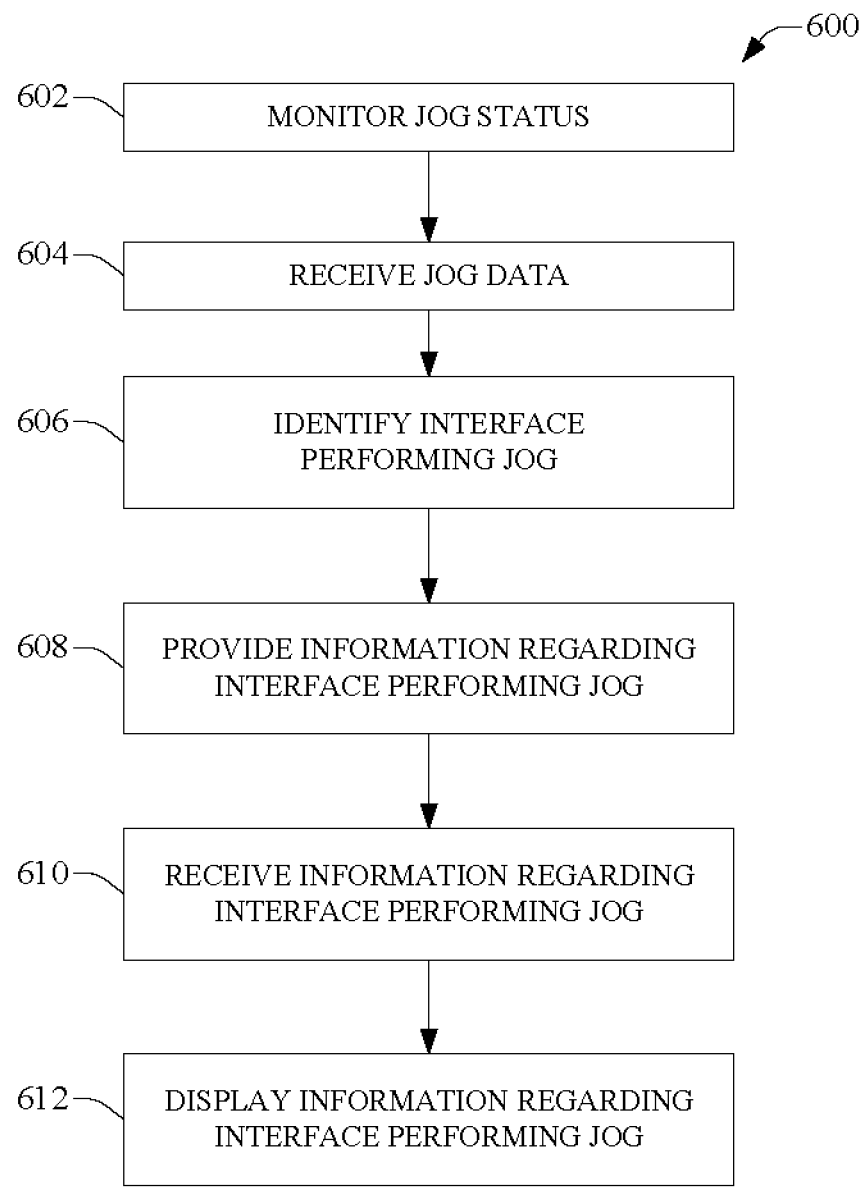
FIG. 6 is a flow diagram illustrating an exemplary, non-limiting embodiment for determining which interface is generating a jog request and publishing information associated therewith.

FIG. 6 depicts a flow diagram illustrating an exemplary, non-limiting embodiment for determining which interface(s) is generating a jog request and publishing information associated therewith. At 602 a controller monitors a plurality of interfaces to detect generation of a jog request. In an exemplary, non-limiting embodiment, while no interface is being employed to generate a jog request, signals are generated (e.g., at a predefined frequency) from each interface in the plurality of interfaces indicating the activity perform no jog. Where a jog request is effected at an interface, a signal indicating a jog operation is to be performed is generated at the interface.

At 604, upon determining that a jog request has been generated, e.g., a perform jog command has been received from an interface being monitored by the controller. Other data or information can also be received with the received jog request, such information can include an identification of the interface which generated the jog request, time of generation, etc.

At 606 the jog request and any associated information can be analyzed to identify which interface generated the jog request, along with such information as time request generated, distance traveled in response to one or more jog requests, and the like.

At 608 any information pertaining to the jog request, e.g., identification of interface employed to generate the request, can be provided to devices associated with the jog request.

At 610, the information (e.g., interface identifier) is received by one or more devices communicatively coupled to the controller, e.g., interfaces 102-104.

At 612, the received information is displayed on the one or more interfaces 102-104, enabling an operator to view information pertaining to any jog requests generated in association with the process. Presentation of such information enables the operator to review a performed jog operation and any other information associated therewith, e.g., to assist in the determining of erroneous generation of a jog request(s). As means allow for displaying of the information, displayed information can range from simply displaying an identifier (e.g., identification number) of an interface generating the jog request, identifiers for a plurality of interfaces generating the jog request, through to displaying information comprising interface identifier(s), time of jog request, motion for jog request, and the like.

Figure 7:
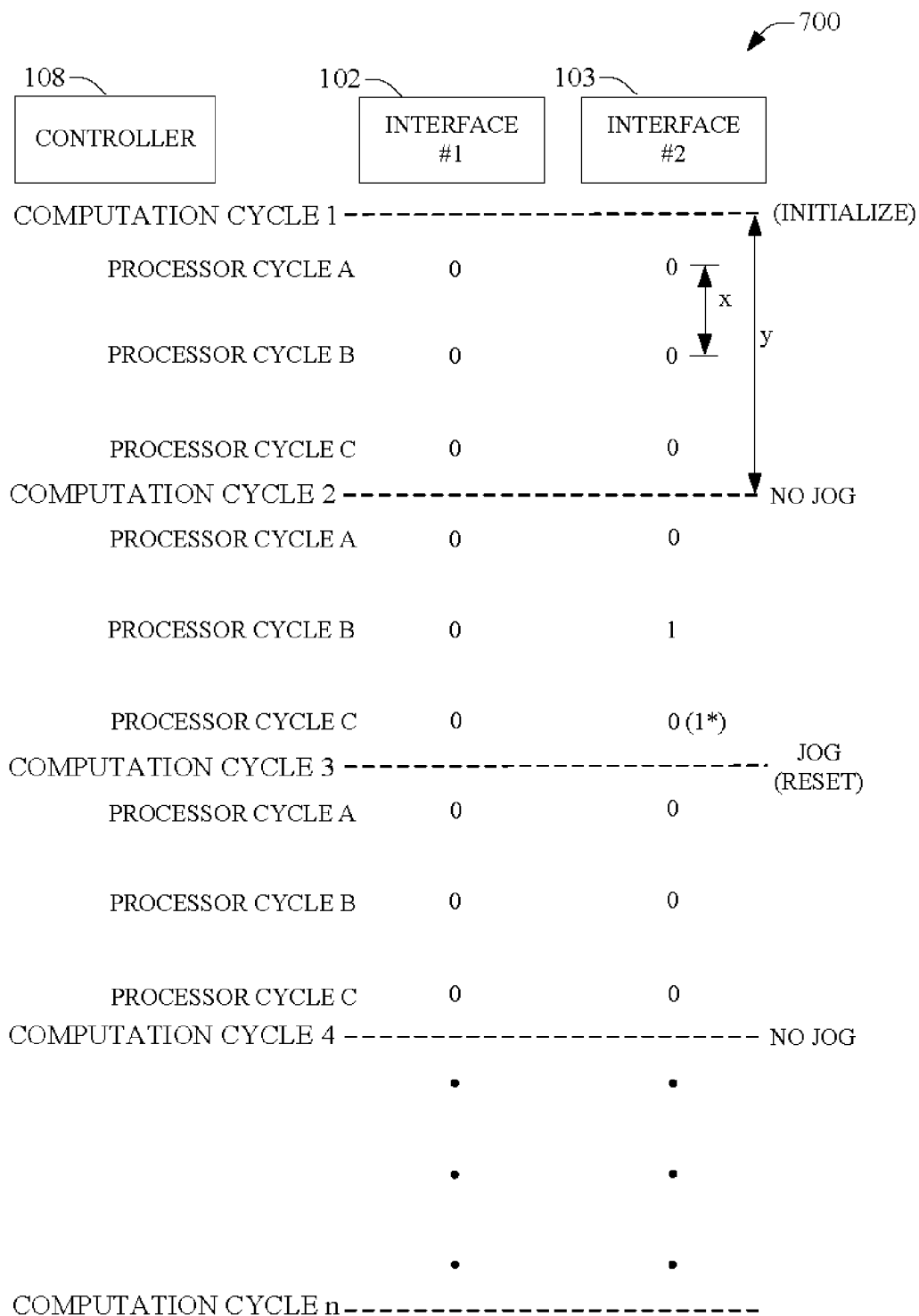
FIG. 7 is a block diagram of an exemplary, non-limiting embodiment illustrating flow of signals and computations performed in a jog request process.

FIG. 7 is a block diagram of an exemplary, non-limiting embodiment illustrating flow of signals and computations performed in a jog request process. System 700 comprises interfaces 102 and 103 operating in conjunction with controller 108. At a given frequency x (e.g., a time period such as a common processor cycle) interfaces 102 and 104 generate signals requesting a jog operation be performed, "1", or no jog operation be performed, "0". Correspondingly, computation cycles are performed in controller 108 at frequency y, whereupon, at each computation cycle an OR gate logic operation is performed, as described previously. FIG. 7, illustrates a scenario where the processor cycle of interfaces 102 and 103 are operating with a frequency greater than the computation cycle of controller 108, e.g., y>x, and creates a scenario where a plurality of jog requests are received from a plurality of interfaces (e.g., interfaces 102 and 103) for a given computation cycle of controller 108.

At computation cycle 1, an initialization operation can be performed, wherein all status' for fields comprising a jog request table (e.g., FIG. 1, table 114) are set to an initial condition of "0", perform no jog.

Processor cycles for interfaces 102 and 103 are executed, whereupon, at each execution interfaces 102 and 103 respectively generate no jog request and jog request signals. As illustrated in FIG. 7, during execution of computation cycle 1 and computation cycle 2, time y, there are three processor cycle executions, processor cycle A, processor cycle B, and processor cycle C. Between computation cycle 1 and computation cycle 2 interfaces 102 and 103 generated only perform no jog requests, and accordingly, at computation cycle 2, no jog is performed.

The processor cycles of the respective interfaces 102 and 103 continue between computation cycle 2 and computation cycle 3. However, during this period, at processor cycle B interface 103 generates a perform jog request, "1". In an exemplary, non-limiting embodiment, for a given time period y, a subsequently received perform no jog request cannot overwrite a prior received perform jog request. Hence, while interface 103 generates a perform no jog request signal for processor cycle C in the subject computation cycle (e.g., after computation cycle 2 and before computation cycle 3) the jog request from processor request B is retained, e.g., "1"*. Hence, upon execution of an OR gate logic operation at computation cycle 3, the perform jog request from processor cycle B is retained and a jog command is generated in response to the execution of the OR gate logic operation at computation cycle 3.

Prior to the execution of the next processor cycle, e.g., processor cycle A, between computation cycle 3 and computation cycle 4, the jog request status' are reset to "0". As shown, between computation cycles 3 and 4 only perform no jog requests are generated by interfaces 102 and 103. Accordingly, upon the execution of the OR gate logic operation at computation cycle 4, no jog command is generated. As illustrated in FIG. 7, the execution of computation cycles, processor cycles, jog requests, no jog requests continues until the jog request operation is terminated at computation cycle n, e.g., the machine being controlled by controller 108 ceases to operate.

Figure 8:
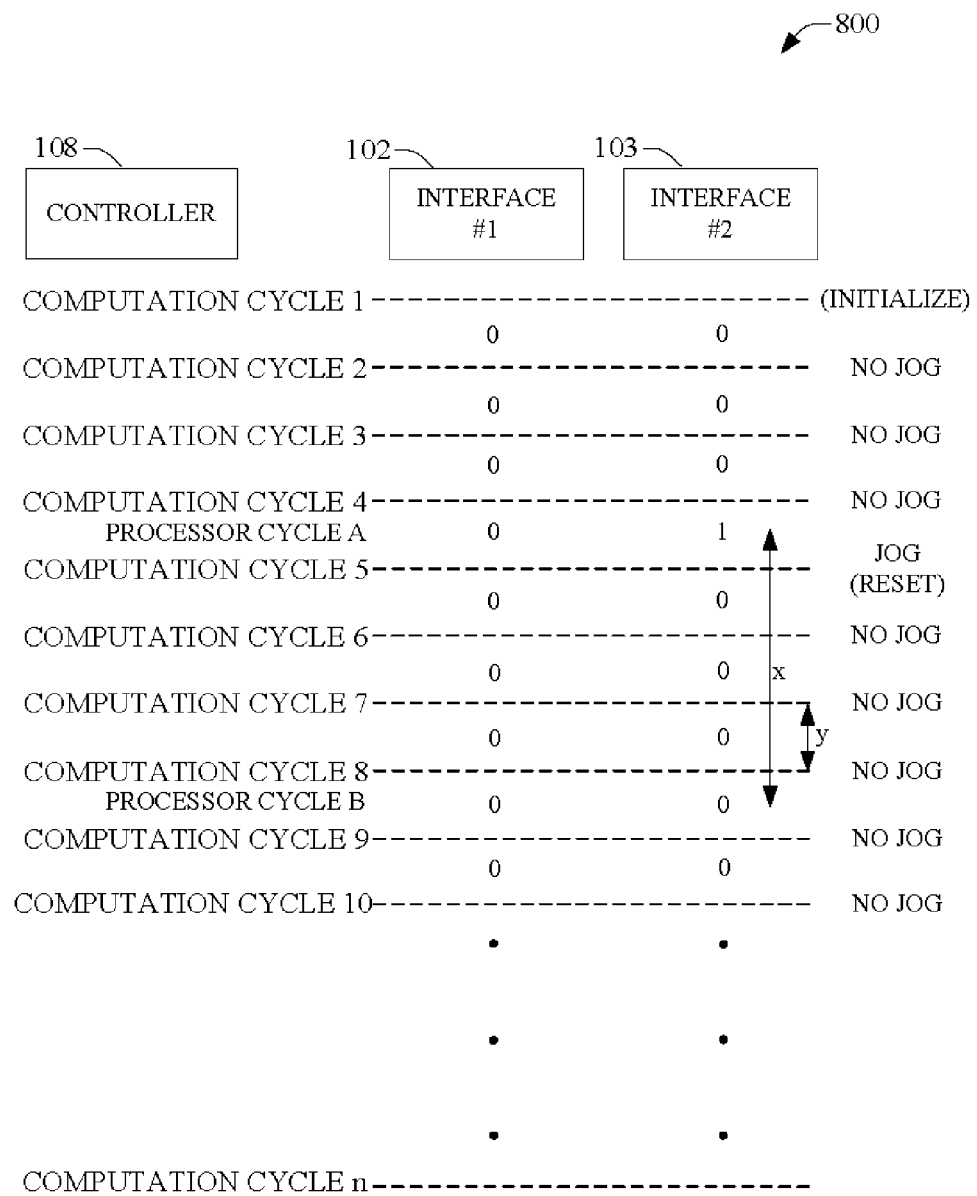
FIG. 8 is a block diagram of an exemplary, non-limiting embodiment illustrating flow of signals and computations performed in a jog request process.

FIG. 8 is a block diagram of an exemplary, non-limiting embodiment illustrating flow of signals and computations performed in a jog request process. System 800 comprises interfaces 102 and 103 operating in conjunction with controller 108. In comparison with FIG. 7, the frequency with which a computation cycle is performed at controller 108, frequency y, is greater than the frequency with which jog requests are generated at interfaces 102 and 103, frequency x (e.g., processor cycle A to processor cycle B).

As shown in FIG. 8, upon initialization, the respective value settings stored in the respective fields comprising table 114 (not shown) are set to "0". As each computation cycle executes, e.g., computation cycles 1-4, either no signal(s) are received from interfaces 102 and 103, or only perform no jog signals are received, and the jog status values remain at '0'.

However, between execution of computation cycle 4 and computation cycle 5, a processor cycle A (e.g., at interfaces 102 and 103) executes and a perform jog signal is forwarded from interface 103 and changes the jog status to "1". Upon execution of computation cycle 5, e.g., the OR gate logic operation is performed, a perform jog command is determined to have been generated by interface 103 and, accordingly, a jog command is generated at controller 108.

Upon execution of the computation cycle 5, and a perform jog request has been determined and acted upon, the jog request status' are reset to "0". Computation cycles 6 to 8 are executed whereupon the jog request status' remain at "0" and no jog commands are generated. Between computation cycle 8 and computation cycle 9, an execution of processor cycle B occurs, however, during this execution only perform no jog signals are generated and accordingly, at execution of computation cycle 9, no jog command is generated. The execution of computation cycles and processor cycles continues until the jog request process is ceased, e.g., by turning off the machine being controlled by controller 108.

It is to be appreciated that while FIGS. 7 and 8 present, effectively what are rigid execution timings of the controller 108 computation cycle(s) and the processor cycle(s) of interfaces 102 and 103, e.g., FIG. 7 where x>y and FIG. 8 where y>x, the concepts presented herein are not so limited. For example, generation of a jog request at an interface (e.g., interface 102) may be based purely upon an associated jog button (or the like) being pressed and the jog request is generated then, as opposed to the interface generating perform no jog and perform jog requests in lock step with the execution of the processor cycles. Hence, in an exemplary, non-limiting embodiment any of the execution of the OR gate logic operation, the generation of the perform jog request, and combination thereof can be in a more random manner than being explicitly tied to device clock signals, device timings, etc.

Further, as mentioned, the respective computation cycle and processor cycle timings can be based upon device clock signals, and the like. However, it is to be appreciated that any suitable settings can be applied to timings x and z, if required.

Figure 9:
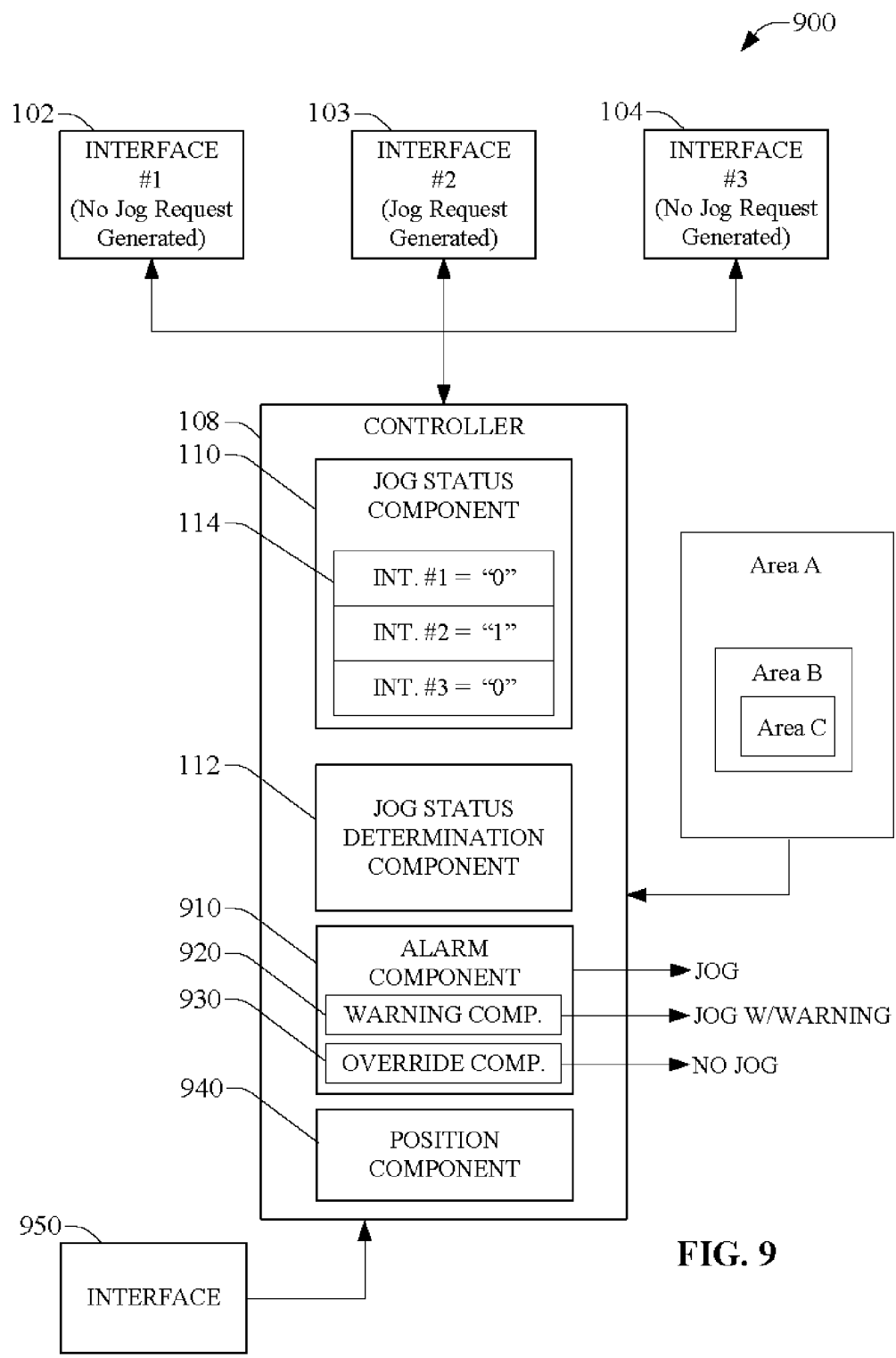

Turning to FIG. 9, is a block diagram illustrating an exemplary, non-limiting embodiment to facilitate determination of whether a jog request is to be complied with. Controller 108 comprises components (110, 112, and 114) previously described to facilitate receipt and processing of a jog request generated by any of a plurality of interfaces (e.g., interfaces 102-104) notification of which interface is generating a jog request.

While an operator is generating jog requests (e.g., by pressing a jog button) any item under control of the jog request can be moved accordingly, e.g., move 10 microns per each press of the jog button. However, a situation can arise where by complying with a jog request an unwanted situation can occur, e.g., running a tool into a workpiece. To avoid such a scenario, it is possible to establish operating areas (e.g., Area A), perimeters, and the like, where a jog request can be complied with without concern for damage to a machine, tool, workpiece, and the like. However, when a tool is positioned within an established area (e.g., Area B) a warning can be provided to inform the operator that the jog requests are causing a component to be moved to a position which could be potentially damaging. And, further, if a jog request is generated which would cause a component to move within an area (e.g., Area C) of high potential damage, certain damage, and the like, the jog request can be overridden.

Areas A-C can be established by entry of positions, datums, etc., entered into an interface, such as interfaces 102-104, or a different interface 950. Interface 950 can be purpose designed to facilitate such entry, or can be any other suitable means for providing positioning data, e.g., a remote workstation communicatively coupled to controller 108. Further, interface 950, in an exemplary, non-limiting embodiment, can facilitate uploading of machine drawings, operation code, position code, etc., which can be employed to establish any of areas A-C.

The positioning data, datums, operation code, and the like, can be uploaded to a position component 940, which retains information regarding Area(s) A-C.

Alarm component 910 can be employed to establish what actions are to be performed based on a current/future position of a component in relation to responding to a jog request. For example, alarm component 910 can be employed to associate Area A with no activity, Area B with generate warning but allow jog request to be complied with, and/or Area C with override jog request. In a non-exhaustive and non-limiting list of example actions, warning component 920 can be utilized to establish what actions are to be performed in the event of a warning situation arising (e.g., component in Area B), where a light (not shown) can be illuminated in the event of a warning being triggered, a warning signal generated, a message can be generated and displayed on display component 520 (see FIG. 5), and the like.

Override component 930 can be employed to establish what actions are to be undertaken when a jog request, if conformed with, may lead to potential or actual damage. In a non-exhaustive, non-limiting list, override component 940 can be employed to explicitly define that if a component is going to move into Area C as a result of complying with a jog request, then the jog request is overridden and the corresponding jog status field is set to a value of "0", do not perform jog. Further, any suitable means to alert an entity of the jog request being overridden can be employed including illuminating a light, generation of warning signal, presentation of jog request denial on display component 520, and the like. Further, override component 930 can prevent any further jog requests being received at the controller, either by disabling the device(s) from which a jog request is generated, e.g., a jog button 510 on interface 102, preventing jog request signal(s) from being received at controller 108, preventing status updates to be made to table 114, and/or all the fields comprising 114 are set to "0".

In an exemplary, non-limiting embodiment, position signals can be received from device(s) (not shown) monitoring Areas A-C and the position component 940, in conjunction with any of alarm component 910, warning component 920 and override component 930 can be employed to determine what action should be taken in response to a jog request received from any of interfaces 102-104. Position component 940 and alarm component 910 may determine that no action is to be taken with regard to inhibiting the jog request, and a jog signal is to be generated. Warning component 920 causes a warning to be generated along with the jog request to be performed. Override component 940 prevents the jog request being performed.

Figure 10:
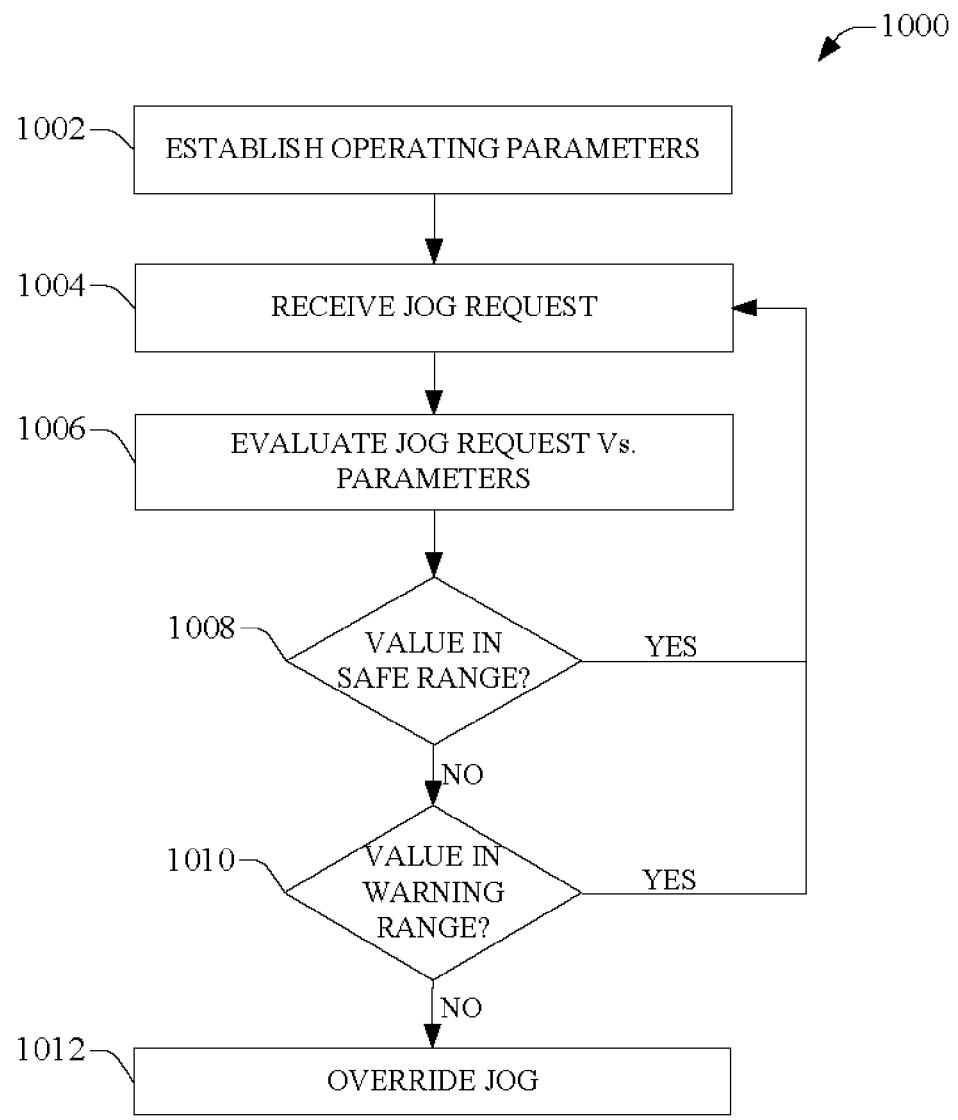

FIG. 10 depicts a flow diagram illustrating an exemplary, non-limiting embodiment for determining whether a jog request is to be complied with. At 1002 operating parameters are established. Such parameters can include, but not limited to, areas, regions, positions, and the like, where a jog request can safely be complied with, a jog request can be complied with but there is concern that a future jog request could lead to an unwanted effect such as damage to a tool, workpiece, machine, etc., and/or a jog request, if complied with, has a high potential for, or will certainly result in, damage to workpiece, tool, machine, and the like. Further, operating parameters can be established to identify what action is to be performed in the event of complying with a jog request having no detrimental effect, a jog request having potential for damage, and a jog request which will result in damage. In a non-exhaustive list, in the event that no damage will occur (e.g., operating in Area A of FIG. 9) the jog request can be complied with and a jog command can be generated. In the event of there being potential for damage, (e.g., operating in Area B of FIG. 9) the jog request can be complied with along with a warning being generated to identify that a future jog request may give rise to damage. In the event of damage will occur (e.g., operating in Area C of FIG. 9) the jog request can be overridden and means for entering a future jog request can be temporarily and/or permanently disabled.

At 1004, a jog request is received from a device employed to generate a jog request, as discussed supra.

At 1006 the effects of executing the jog request is evaluated. In an exemplary, non-limiting embodiment, execution of a machine jog in accord with a jog request can be compared with the operating parameters established at 1002, for example, would a problem occur if a tool is moved 10 microns in response to execution of a jog request?

At 1008, a determination is made regarding whether motion of a tool, machine head, component, etc., under the control of the jog request has potential for, or will, cause damage. If the motion is in a safe range with regard to the established operating parameters, e.g., there is not potential for damage then the jog request can be serviced and the method returns to 1004. If the motion is not in a safe range then the method continues to 1010.

At 1010, a determination is made regarding whether compliance with the jog request will have potential for an unwanted effect, e.g., damage, but the current jog request can be undertaken. If the determination is yes, the jog request can be executed accompanied with a warning, and the method proceeds to 1004. If the motion has potential or will cause an unwanted effect, then the method proceeds to 1012.

At 1012, in view of the potential or causing of an unwanted effect, e.g., tool damage, then the jog request can be overridden. The jog request process can be temporarily or permanently disabled.

Figure 11:
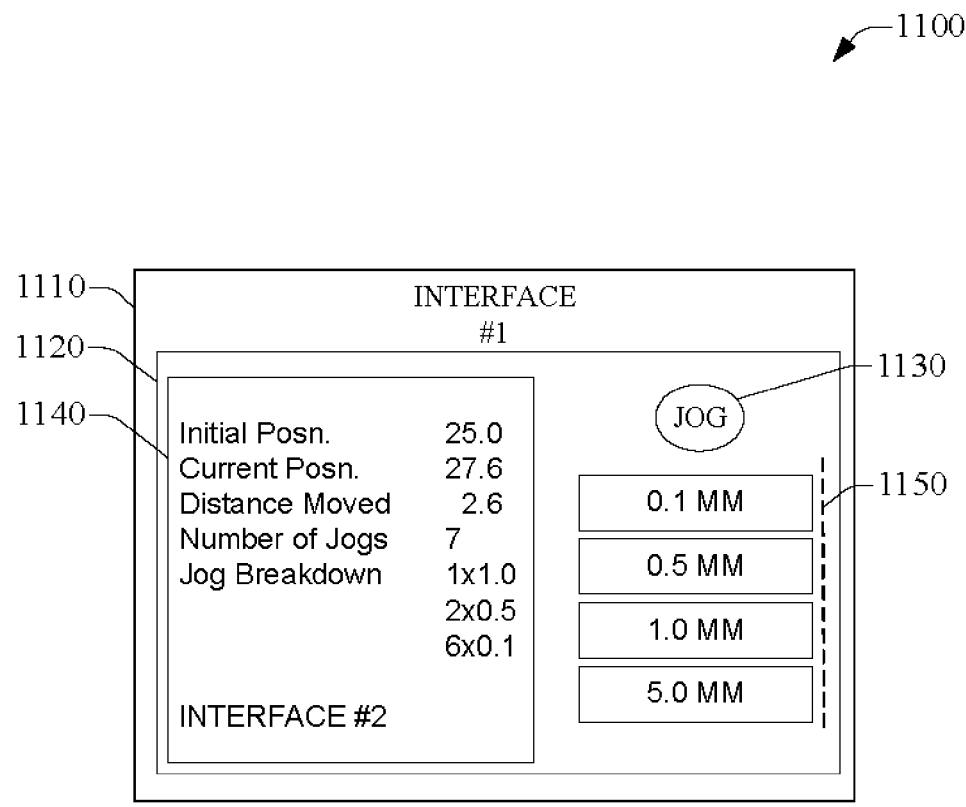
FIG. 11 is a block diagram illustrating an exemplary, non-limiting embodiment to facilitate selection of a jog request and display of information pertaining thereto.

FIG. 11 is a block diagram illustrating an exemplary, non-limiting embodiment to facilitate selection of a jog request and display of information pertaining thereto. System 1100 comprises an interface 1110 (e.g., any of interfaces 102-105) further comprising a touchscreen 1120 which has been demarked into regions facilitating operation of a jog request via jog button 1130 (e.g., jog button 510), selection of a jog parameter via jog distance buttons 1150, and a display 1140 (e.g., display 520) where information related to one or more jog requests can be displayed.

Rather than operation of a jog button, e.g., pressing button 1130 effecting a single pre-defined displacement of a device associated with interface 1110, e.g., a valve to be displaced, a lever to be elevated, system 1100 enables an entity, e.g., operator of interface 1110 to select from a plurality of displacements. In an exemplary embodiment, jog distance buttons 1150 allow an entity to select from any of the indicated distances of 0.1 MM, 0.5 MM, 1.0 MM, or 5.0 MM. Hence, during an initial location of a component, e.g., a machine head in relation to a workpiece, a movement of 5.0 MM can be selected with the appropriate jog distance button 1150, whereupon, for each operation of jog button 1130 the machine head will move 5.0 MM. However, as the machine head moves closer to the work piece, it may be preferred to move to a safer degree of displacement per operation of jog button 1130 and, accordingly, the jog distance button 1150 effecting a 0.5 MM movement can be selected, whereupon, for each subsequent operation of the jog button 1130 the machine head will move 0.5 MM. It is to be appreciated that the number of jog distance button(s) 1150 and distances illustrated on the jog distance button(s) 1150 are exemplary and any number of jog distance button(s) and distances can be made available, e.g., other metric, imperial, or combinations thereof, can be provided.

Further, an entity, e.g., operator of interface 1110 can set up a plurality of jog distance button(s) that they prefer to utilize and these can be presented as jog distance button(s) 1150. For example, an operator can preconfigure five jog distance button(s) with a particular jog distance assigned thereto, e.g., jog distance button 1=10.0 MM, jog distance button 2=5.0 MM, jog distance button 3=2.0 MM, jog distance button 4=0.5 MM and jog distance button 5=0.1 MM. Hence, when the entity identifies themselves to the system of interfaces (e.g., logs in via interface 102—not shown) the jog distance button(s) on the various interfaces (e.g., interfaces 102-105) are displayed in accord with the preference(s) of the entity.

In another example, the number of jog distance button(s) 1150 and the jog distances they effect can be a function of the type of process being performed in association with the interface system (e.g., interfaces 102-105) of which interface 1110 forms a part. For example, a jog operation is associated with a plurality of valves, wherein a first valve is fairly rudimentary in operation and a large degree of leeway in movement is acceptable, while for a second valve, movement has to be controlled very precisely. When the interface system is being employed to control the first valve three jog distance buttons are displayed effecting respective jog distances of 10 MM, 5 MM, and 1 MM. However, when the interface system is being employed to control the second valve, four jog distance buttons are displayed effecting respective jog distances of 5 MM, 1 MM, 0.5 MM and 0.1 MM. As illustrated in FIG. 11, display 1140 facilitates presentation of information pertaining to one or more aspects of a jog request. For example, as shown, display 1140 can present a plurality of information regarding one or more jog requests, such as an initial position (e.g., the position of a machine table prior to a jog request being initiated), current position (e.g., current position of a machine table), distance moved (e.g., distance moved by a machine table as a result of a single jog request or a plurality of jog requests), number of jog requests (e.g., number of jog requests made in a current sequence of jog requests), breakdown of jog requests (e.g., in a situation where a plurality of jog distances can be selected (e.g., via jog distance button(s) 1150) how many jog requests were generated for each available jog distance), and also as discussed previously whichever interface is generating the jog request(s) can also be displayed (e.g., interface 1110 is presented as interface #1 while jog requests are being generated from interface #2). It is to be appreciated that the various pieces of information illustrated as being presented on display 1140 are exemplary, and any information pertaining to one or more jog requests can be presented on display 1140, whether the information is generated in response to jog requests being generated from a particular interface, available in a plurality of interfaces, or the jog requests are being generated from a plurality of interfaces.

Figure 12:
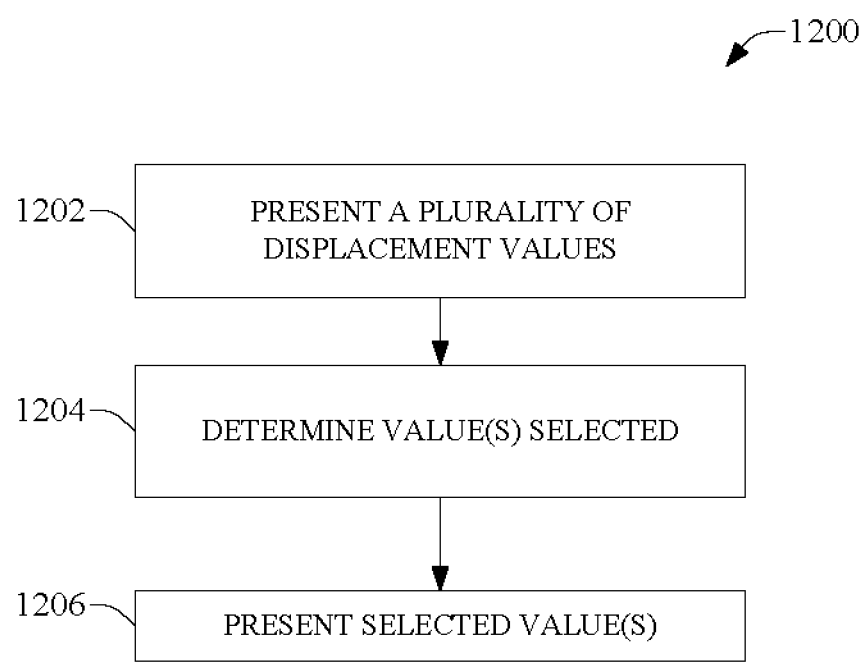
FIG. 12 depicts a flow diagram illustrating an exemplary, non-limiting embodiment for presenting and selecting a plurality of available jog displacements.

FIG. 12 depicts a flow diagram illustrating an exemplary, non-limiting embodiment for presenting and selecting a plurality of available jog displacements. At 1202 a plurality of values of available displacements are presented (e.g., on touchscreen 1120) where, for example, the values can be based upon a type of process being, or to be performed, available jog distances, or jog distances preferred by an operator, and the like.

At 1204, a determination is made regarding which jog displacements were selected.

At 1206 the selected jog displacements are presented on the interface. For example, distances of 0.1 MM, 0.5 MM, 1.0 MM, 5.0 MM, and 10 MM were selected and, accordingly, five jog distance buttons (e.g., jog buttons 1150) are displayed (e.g., on touchscreen 1120), one button for each of the selected distances.

Exemplary Computing Device

As mentioned, advantageously, the techniques described herein can be applied to any system supporting the control operations described herein. It can be understood, therefore, that handheld, portable and other computing devices and computing objects of all kinds are contemplated for use in connection with the various embodiments, i.e., generation and determination of machine jog requests. Accordingly, the below general purpose remote computer described below in FIG. 13 is but one example of a computing device, where the computing device can comprise any of the interfaces and controller as presented above.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
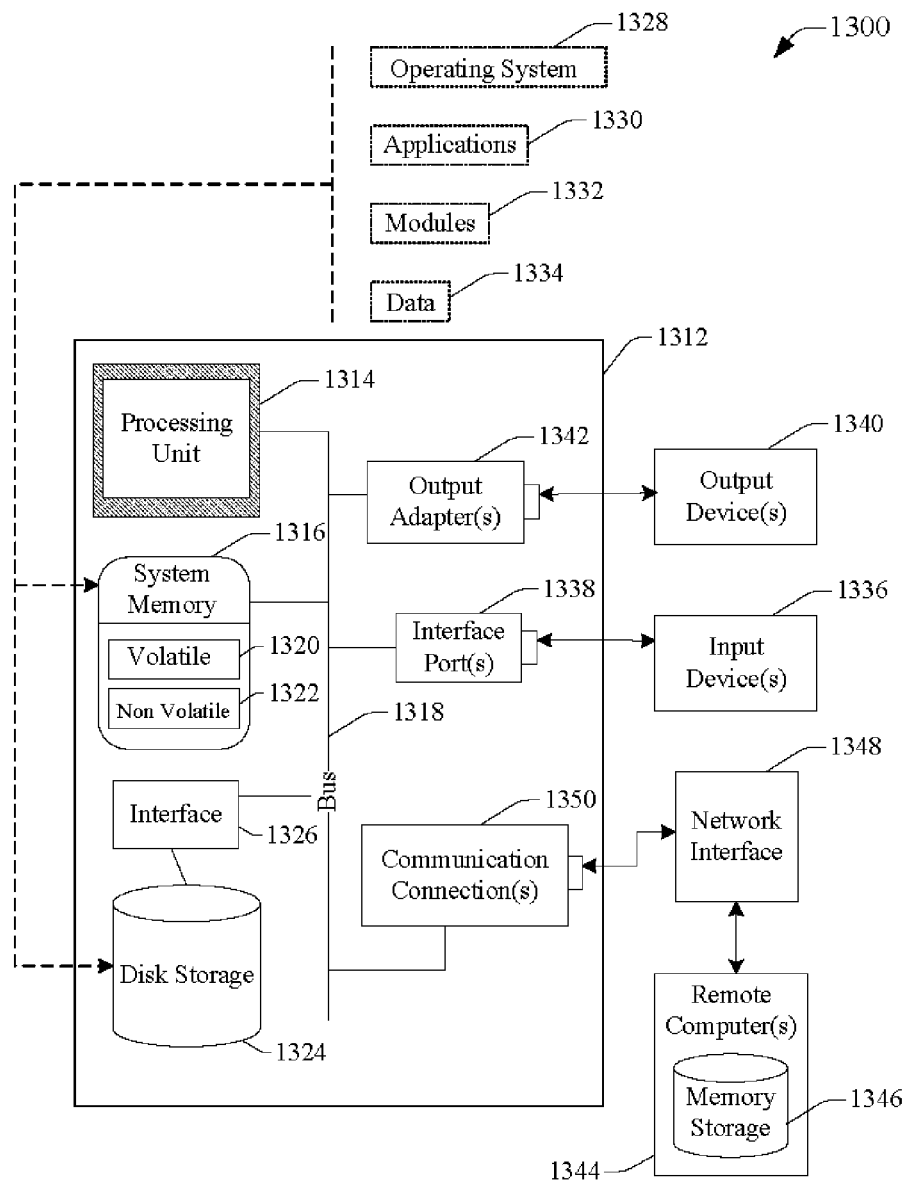
FIG. 13 illustrates an exemplary, non-limiting computing environment facilitating operation of one or more exemplary, non-limiting embodiments disclosed herein.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the exemplary computing system environment 1300.

With reference to FIG. 13, an example environment 1310 for implementing various aspects of the aforementioned subject matter, including retaining documentation natively within memory of an industrial controller, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Exemplary Networked and Distributed Environments

One of ordinary skill in the art can appreciate that the various embodiments of the jog request generation and control system and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in video viewing and tagging mechanisms as described for various embodiments of the subject disclosure.

Figure 14:
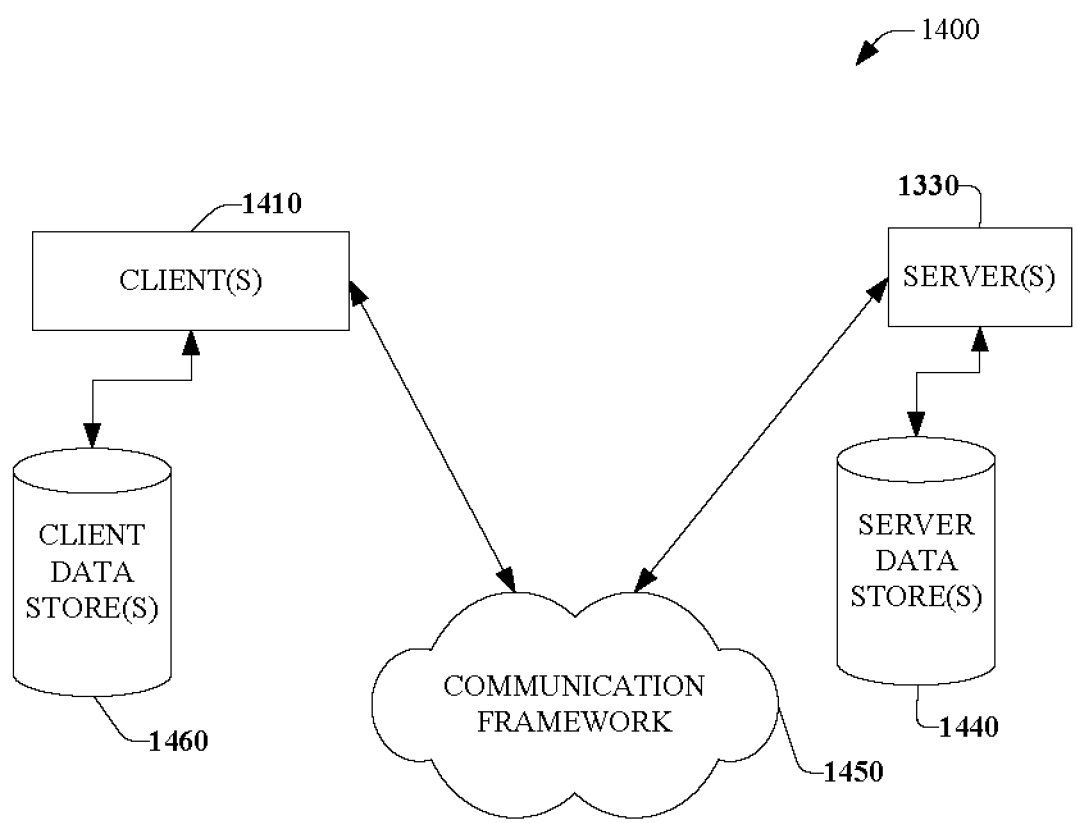
FIG. 14 illustrates an exemplary, non-limiting networking environment facilitating operation of one or more exemplary, embodiments disclosed herein.

FIG. 14 is a schematic block diagram of a sample-computing environment 1400 with which the disclosed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

As mentioned above, while exemplary embodiments have been described in connection with various computing devices and network architectures, the underlying concepts may be applied to any network system and any computing device or system in which it is desirable to implement generation of jog requests and according generation of control signals based thereon.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component", "module", "system", and the like, are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
   a controller configured to iteratively execute on a computational cycle basis defined for the controller:
      receive a plurality of real-time jog operation requests associated with controlling a jog operation of a machine from a plurality of devices, wherein the respective real-time jog operation requests comprise values indicating to perform the jog operation by the machine or do not perform the jog operation by the machine;
      store respective most recent values of the values from the plurality of devices in jog status fields of a table associated with the machine, wherein the jog status fields are respectively assigned to devices of the plurality of devices;
      perform an OR operation on the most recent values in the jog status fields to determine whether all of the most recent values in the jog status fields indicate the machine is not to perform the jog operation, wherein during each computational cycle a most recent value in a jog status field associated with a real-time jog operation request is retained until a subsequent real-time jog operation request with a different value from a corresponding assigned device is received that overwrites the most recent value; and
      in response to determining that not all of the most recent values in the jog status fields indicate the machine is not to perform the jog operation, issue a command to the machine to perform the jog operation.

2. The system of claim 1, wherein the controller is further configured to perform the OR operation comprising:
   in response to all of the most recent values in the jog status fields indicating do not perform the jog operation, determine that the machine is not to perform the jog operation.

3. The system of claim 1, wherein the controller is further configured to:
   in response to receipt of multiple jog operation requests from a device of the plurality of devices within a specified time interval, ignore real-time jog operation requests of the multiple real-time jog operation requests having the type of do not perform the jog operation if a prior received real-time jog operation request of the multiple real-time jog operation requests has the type of perform the jog operation.

4. The system of claim 1, wherein the controller is further configured to determine whether a device of the plurality of devices is providing incorrect real-time jog operation requests.

5. The system of claim 4, wherein the controller is further configured to set the jog status field assigned to the device to a safe value in response to a determination that the device is providing incorrect real-time jog operation requests.

6. The system of claim 5, wherein the safe value is one of a Set value, a Reset value, or a Hold Last State value.

7. The system of claim 1, wherein the controller is further configured to set the respective jog status fields to the value indicating the do not perform the jog operation in response to the issuance of the command for the machine to perform the jog operation.

8. A method comprising:
   receiving, by a device including a processor, a plurality of real-time jog commands associated with controlling a jog operation of an industrial component from a plurality of interface components, wherein the respective real-time jog commands comprise values indicating to perform the jog operation by the industrial component or do not perform the jog operation by the industrial component;
   storing, by the device, respective most recent values from the plurality of interface components in jog status fields of a table associated with the industrial component, wherein the jog status fields are respectively assigned to interface components of the plurality of interface components;
   performing, by the device iteratively on a computational cycle basis defined for the device, an OR operation on the most recent values in the jog status fields to determine whether all of the most recent values in the jog status fields indicate the machine is not to perform the jog operation, wherein during each computational cycle a most recent value in a jog status field associated with a real-time jog command is retained until a subsequent real-time jog command with a different value from a corresponding assigned interface component is received that overwrites the most recent value; and
   in response to determining that not all of the most recent values in the jog status fields indicate the machine is not to perform the jog operation, issuing, by the device, a command to the machine to perform the jog operation.

9. The method of claim 8, wherein the performing the OR operation comprises, in response to all of the most recent values in the jog status fields indicating do not perform the jog operation, determining that the machine is not to perform the jog operation.

10. The method of claim 8, further comprising, in response to receipt of multiple real-time jog operation commands from an interface component of the plurality of interface components within a specified time interval, ignoring, by the device, real-time jog operation commands of the multiple real-time jog operation commands having the type of do not perform the jog operation under the condition that a prior received real-time jog operation command of the multiple real-time jog operation commands has the type of perform the jog operation.

11. The method of claim 8, further comprising determining, by the device, whether an interface component of the plurality of interface components is providing incorrect real-time jog operation commands.

12. The method of claim 11, further comprising setting, by the device, the jog status field assigned to the interface component to a safe value in response to a determination that the interface component is providing incorrect real-time jog operation commands.

13. The method of claim 12, wherein the safe value is one of a Set value, a Reset value, or a Hold Last State value.

14. The method of claim 8, further comprising setting, by the device, the respective jog status fields to the value indicating the do not perform the jog operation in response to the issuance of the command for the machine to perform the jog operation.

15. A non-transitory computer readable medium having instructions stored thereon, that, in response to execution, cause a system including a processor to perform operations comprising:
receiving a plurality of real-time jog commands associated with controlling a jog operation of an industrial process from a plurality of industrial components, wherein the respective real-time jog commands comprise values indicating to perform the jog operation or do not perform the jog operation;
storing respective most recent values from the plurality of industrial components in jog status fields of a table associated with the industrial process, wherein the jog status fields are respectively assigned to industrial components of the plurality of industrial components;
performing iteratively on a computational cycle basis defined for the system, an OR operation on the most recent values in the jog status fields to determine whether all of the most recent values in the jog status fields indicate the machine is not to perform the jog operation, wherein during each computational cycle a most recent value in a jog status field associated with a real-time jog command is retained until a subsequent real-time jog command with a different value from a corresponding assigned industrial component is received that overwrites the most recent value; and
in response to determining that not all of the most recent values in the jog status fields indicate the industrial process is not to perform the jog operation, issuing, by the device, a command to the industrial process to perform the jog operation.

16. The non-transitory computer readable medium of claim 15, wherein the performing the OR operation comprises, in response to all of the most recent values in the jog status fields indicating do not perform the jog operation, determining that the industrial process is not to perform the jog operation.

17. The non-transitory computer readable medium of claim 15, further comprising, in response to receipt of multiple real-time jog operation commands from an industrial component of the plurality of industrial components within a specified time interval, ignoring, by the device, real-time jog operation commands of the multiple real-time jog operation commands having the type of do not perform the jog operation under the condition that a prior received real-time jog operation command of the multiple real-time jog operation commands has the type of perform the jog operation.

18. The non-transitory computer readable medium of claim 15, further comprising determining, by the device, whether an industrial component of the plurality of industrial components is providing incorrect real-time jog operation commands.

19. The non-transitory computer readable medium of claim 15, further comprising setting, by the device, the jog status field assigned to the industrial component to a safe value in response to a determination that the industrial component is providing real-time incorrect jog operation commands.

20. The non-transitory computer readable medium of claim 19, wherein the safe value is one of a Set value, a Reset value, or a Hold Last State value.

* * * * *